US010997430B1

(12) United States Patent
Slavin

(10) Patent No.: US 10,997,430 B1
(45) Date of Patent: May 4, 2021

(54) DANGEROUS DRIVER DETECTION AND RESPONSE SYSTEM

(71) Applicant: Alarm.com Incorporated, Tysons, VA (US)

(72) Inventor: Alison Jane Slavin, Falls Church, VA (US)

(73) Assignee: Alarm.com Incorporated, Tysons, VA (US)

( * ) Notice: Subject to any disclaimer, the term of this patent is extended or adjusted under 35 U.S.C. 154(b) by 127 days.

(21) Appl. No.: 16/533,935

(22) Filed: Aug. 7, 2019

Related U.S. Application Data

(60) Provisional application No. 62/715,329, filed on Aug. 7, 2018.

(51) Int. Cl.
| | | |
|---|---|---|
| *G06K 9/00* | (2006.01) | |
| *G10L 15/22* | (2006.01) | |
| *B60Q 1/52* | (2006.01) | |
| *H04W 4/38* | (2018.01) | |
| *H04W 4/48* | (2018.01) | |
| *H04W 4/029* | (2018.01) | |

(52) U.S. Cl.
CPC ......... *G06K 9/00791* (2013.01); *B60Q 1/525* (2013.01); *G10L 15/22* (2013.01); *H04W 4/029* (2018.02); *H04W 4/38* (2018.02); *H04W 4/48* (2018.02)

(58) Field of Classification Search
None
See application file for complete search history.

(56) References Cited

U.S. PATENT DOCUMENTS

| | | | |
|---|---|---|---|
| 9,430,944 B2 | 8/2016 | Grimm et al. | |
| 2015/0344038 A1 | 12/2015 | Stenneth et al. | |
| 2016/0233946 A1* | 8/2016 | Wengrovitz | G05D 1/0011 |
| 2017/0017734 A1 | 1/2017 | Groh et al. | |
| 2018/0033429 A1* | 2/2018 | Makke | G10L 15/30 |
| 2018/0102051 A1 | 4/2018 | Suthar | |
| 2019/0197887 A1* | 6/2019 | Modi | G08G 1/04 |

FOREIGN PATENT DOCUMENTS

| | | | | |
|---|---|---|---|---|
| CN | 205656627 U | * | 10/2016 | |
| CN | 107031548 A | * | 8/2017 | ....... B60R 21/01512 |
| CN | 206446521 U | * | 8/2017 | |
| CN | 206569010 U | * | 10/2017 | |
| WO | WO 2014000161 | | 1/2014 | |
| WO | WO 2017123655 | | 7/2017 | |

\* cited by examiner

*Primary Examiner* — Mohammed Rachedine
(74) *Attorney, Agent, or Firm* — Fish & Richardson P.C.

(57) ABSTRACT

Methods and systems, including computer programs encoded on a computer storage medium, for a dangerous driver and response system. In one aspect, a system includes a monitoring device that includes a sensor and a camera and that is configured to generate, using the sensor, sensor data that reflects an attribute in a vicinity of the monitoring device, and based on the sensor data, initiate collection of video data using the camera. The system further includes a computing device that is configured to, based on the sensor data and the video data, identify an event that is occurring in the vicinity of the monitoring device, based on the event that is occurring in the vicinity of the monitoring device, access additional information associated with the event, based on the event, generate an alert and identify a recipient for the alert, and provide, for output to the recipient, the alert.

20 Claims, 7 Drawing Sheets

DANGEROUS DRIVER DETECTION AND RESPONSE SYSTEM

CROSS-REFERENCE TO RELATED APPLICATIONS

This patent application claims benefit to U.S. Provisional Application Ser. No. 62/715,329, filed on Aug. 7, 2018, which is incorporated by reference herein.

TECHNICAL FIELD

This disclosure relates generally to monitoring systems.

BACKGROUND

Drivers can be faced with the challenge of observing dangerous drivers in their vicinity but not having the ability to report the issue to the relevant local authorities with useful information to assist with apprehending the dangerous driver.

SUMMARY

Techniques are described for a system for drivers to report dangerous drivers and/or other hazards that can affect driving conditions and where the system provides alerts to the relevant (e.g., local) emergency service providers. Dangerous driver detection and response systems can include various monitoring hardware devices installed at a reporting vehicle that can collect data and report dangerous drivers to emergency response personnel.

In general, one innovative aspect of the subject matter described in this specification can be embodied in systems that include a monitoring device that includes a sensor and a camera and that is configured to generate, using the sensor, sensor data that reflects an attribute in a vicinity of the monitoring device, and based on the sensor data, initiate collection of video data using the camera. The system also includes a computing device that is configured to, based on the sensor data and the video data, identify an event that is occurring in the vicinity of the monitoring device, based on the event that is occurring in the vicinity of the monitoring device, access additional information associated with the event, based on the event, generate an alert and identify a recipient for the alert, and provide, for output to the recipient, the alert. Other embodiments of this aspect include corresponding systems, apparatus, and computer programs, configured to perform the actions of the methods, encoded on computer storage devices.

These and other embodiments can each optionally include one or more of the following features. In some implementations, the computing device is configured to identify a different monitoring device that is geographically proximate to a location of the event and that includes a camera, provide instructions to the different monitoring device to initiate collection of video data using the camera, and receive, from the different monitoring device, the collected video data.

In some implementations, the computing device is configured to identify an event that is occurring in the vicinity of the monitoring device by determining that a dangerous driver event is occurring in the vicinity of the monitoring device.

In some implementations, the computing device is configured to determine a verbal or non-verbal command from a user based on the sensor data. The computing device can be configured to determine a likely intent of the user based on the verbal or non-verbal command, and identify the event that is occurring in the vicinity of the monitoring system based on the verbal or non-verbal command and the likely intent of the user.

In some implementations, the monitoring device is configured to generate additional sensor data that reflects an additional attribute in the vicinity of the monitoring device, determine that the additional sensor data comprises a verbal or non-verbal command indicating an end of the event, in response to determining that the additional sensor data comprises a verbal or non-verbal command indicating the end of the event, stop collection of the video data.

In some implementations, the monitoring device is included in a vehicle driven by a user, and the computing device is configured to identify the recipient for the alert by identifying an additional, different user, and provide, for output, the alert by providing, for output to the additional, different user, the alert.

In some implementations, the computing device is configured to identify the additional, different user by determining a current location of the event and determine that a mobile device of an additional, different user is geographically proximate to the current location of the event, and provide, based on determining that the mobile device of the additional, different user is geographically proximate to the current location of the event, for output to the mobile device of the additional, different user, the alert.

In some implementations, the computing device is configured to generate metadata that describes the event, and provide, for output, the alert by providing the video data and the metadata. The computing device can be configured to determine a type of response for the event, access, from among multiple rules for different responses, a rule for the type of response for the event, and based on the rule for the type of response, determine an event response for the event.

In some implementations, the computing device is configured to identify a recipient for the alert by identifying a local authority as the recipient of the alert. Identifying the local authority as the recipient of the alert can include determining a current location of the event and determining, based on the current location of the event, a local authority. Identifying the local authority as the recipient of the alert can include determining a direction of movement of the event, and determining, based on the direction of movement of the event, a second local authority, where the computing device is configured to provide, for output to the second local authority, the alert.

In some implementations, providing the alert includes providing, to the identified recipient, real-time event data for the event while the event is in process including one or more of additional video data and additional location information.

In some implementations, the computing device is configured to identify an event that is occurring in the vicinity of the monitoring device by determining that a vehicle with a dangerous driver is in the vicinity of the monitoring system, and access additional information associated with the event by accessing additional information associated with an identify of the dangerous driver. Based on the additional information associated with the identity of the dangerous driver, the computer device can determine the identity of the dangerous driver, and generate the alert and identify the recipient for the alert based on the identity of the dangerous driver.

In some implementations, the computing device is configured to access the additional information associated with the identity of the dangerous driver by identifying vehicle information data for the vehicle, and based on the vehicle information data for the vehicle, determine a property and a home monitoring system associated with the vehicle. The computing device can access home monitoring system data for the home monitoring system, and determine the identity of the dangerous driver based on the vehicle information data for the vehicle and the home monitoring system data.

In some implementations, the computing device is configured to determine locations of residents of the property associated with the vehicle based on the home monitoring system data, and determine the identity of the dangerous driver based on the locations of the residents of the property associated with the vehicle. The computing device can be configured to, based on the vehicle information data for the vehicle, determine an owner of the vehicle and determine the identity of the dangerous driver based on the owner of the vehicle and the locations of the residents of the property associated with the vehicle. The computing device can be configured to identify the recipient for the alert by identifying the owner of the vehicle as the recipient for the alert, and provide, for output, the alert by providing, for output to the owner of the vehicle, the alert.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

BRIEF DESCRIPTION OF THE DRAWINGS

Like reference numbers and designations in the various drawings indicate like elements.

DETAILED DESCRIPTION

Techniques are described for a system for drivers to report dangerous drivers and/or other hazards that can affect driving conditions and where the system provides alerts to the relevant (e.g., local) emergency service providers. A driver can identify a dangerous driver and engage an onboard event recorder to record image data, location data, and other metadata related to the dangerous driver event. A cloud-based server can receive the recorded event data from the driver's onboard event recorder, process the event data to determine an appropriate response to the event, and provide an alert including collected event data to local emergency service providers (e.g., police) to respond to the dangerous driver event.

Other embodiments can include a system that engages other nearby (e.g., geographically proximate) users and monitoring systems (e.g., traffic cameras) and respective data collection functionality to gather additional event data related to the dangerous driver event.

Figure 1:
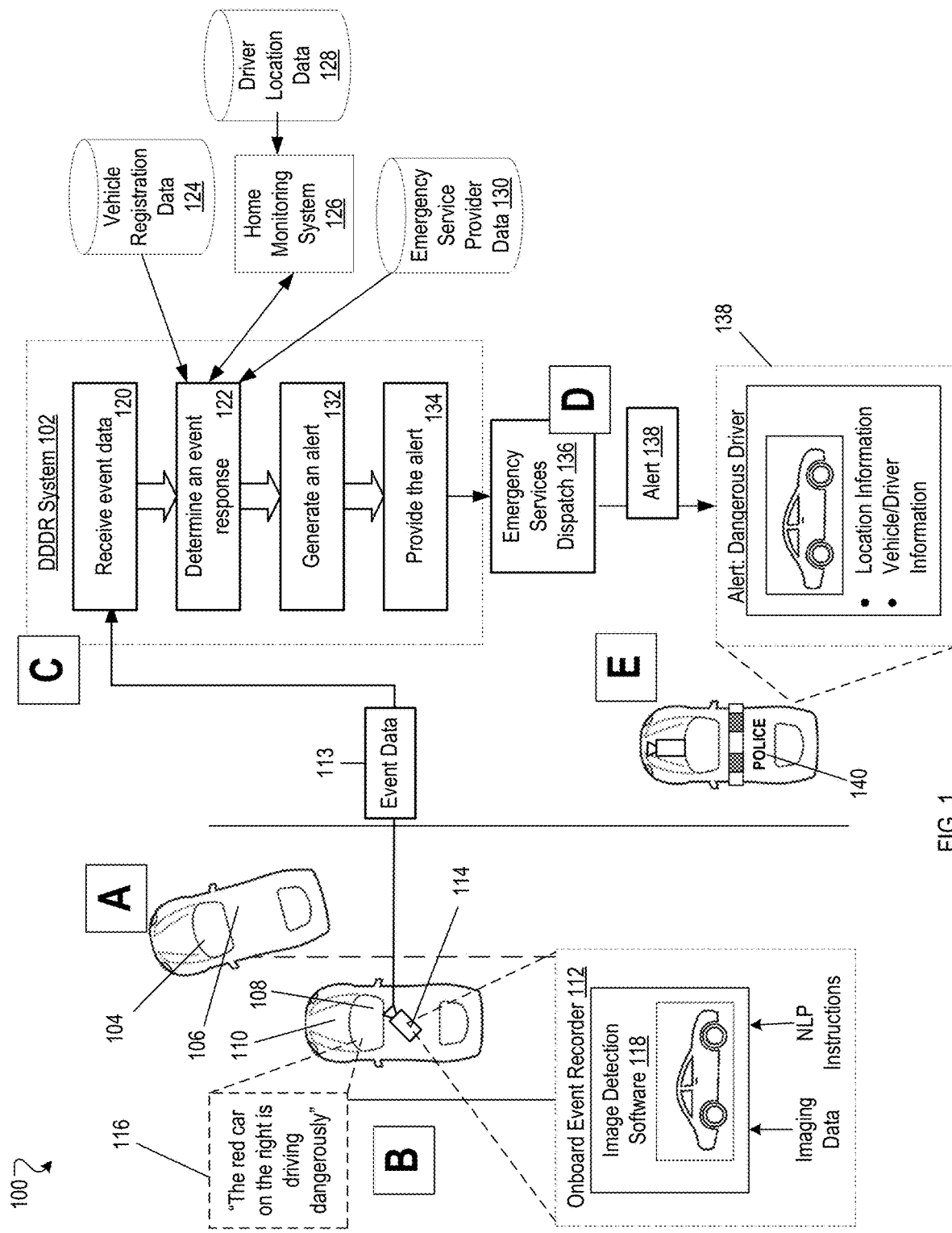
FIG. 1 is an example operating environment for a dangerous driver detection and response system.

FIG. 1 is an example operating environment 100 for a dangerous driver detection and response (DDDR) system 102. In the example of FIG. 1, during stage (A), a dangerous driver 104 of a vehicle 106 is on the roadway. A vehicle 106 can be a commercial or non-commercial vehicle, for example, a car, a truck, a bus, a flatbed, a trailer truck, or another piece of heavy machinery (e.g., a forklift, tractor, and backhoe) that is operated on a roadway. For example, a vehicle 106 can be a car belonging to the dangerous driver 104. In another example, a vehicle 106 can be a car belonging to another driver (e.g., a parent of driver 104, an owner of a car in a vehicle-share program, etc.) In another example, a vehicle 106 can be a commercial trailer trucker (e.g., an 18-wheeler) operated by a commercial driver 104.

A dangerous driver 104 of a vehicle 106 is a driver who is creating a hazardous condition for themselves and/or for other drivers, pedestrians, cyclists, or the like. In one example, a dangerous driver 104 of a vehicle 106 is not obeying traffic laws (e.g., speeding, changing lanes without signaling, not obeying traffic signals). In another example, a dangerous driver 104 of a vehicle 106 is driving erratically (e.g., swerving) and/or aggressively (e.g., tailgating, cutting off other drivers). In yet another example, a dangerous driver 104 of a vehicle 106 is driving distracted (e.g., using a mobile device, reading a newspaper) in a way that is dangerous to themselves and/or other drivers, pedestrians, cyclists, etc. located near the dangerous driver 104.

In some implementations, a hazard or hazardous condition can be in or near a roadway and be reported to the dangerous driver detection and response system 102. A hazard or hazardous condition can be an object or situation that can cause difficulty or peril to a driver, pedestrian, cyclist, etc. on or nearby a roadway. For example, a hazard can be debris or a sinkhole in the roadway. In another example, a hazardous condition can be flooding, low visibility conditions, ice on the road, or the like.

In stage (B), a driver 108 of a vehicle 110 notices the dangerous driver 104 (e.g., is near the dangerous driver 104). Vehicle 110 includes an onboard event recorder 112 including one or more monitoring devices 114. A monitoring device can include, for example, a video camera, a global positioning system (GPS) tracker, a speedometer, a microphone or audio detection sensor, a LIDAR system or other infrared sensors, or the like.

In some implementations, one or more of the monitoring devices 114 (e.g., a video camera) can be mounted on an adjustable stage (e.g., a gimbal, a rotating stage) that allows for the monitoring device 114 position to be adjusted in real-time in order to capture different aspects of an environment surrounding the vehicle 110. For example, a video camera can be mounted on an adjustable stage that allows an area that can be captured by a field of view of the video camera to be 360° degrees surrounding the vehicle 110. In another example, a sensor, e.g., audio sensor, can collect sensor data, e.g., audio data, that is descriptive of or reflects an attribute in a vicinity of the monitoring device 114. The sensor data can include audio data of a user of the monitoring device 114 speaking a statement related to a possible dangerous driver event occurring in the vicinity of the vehicle.

In some implementations, the onboard event recorder 112 can automatically change a position of the monitoring device 114 (e.g., rotate the position of a camera) in order to capture (e.g., within a field of view of the camera) image data of the dangerous driver 104. In some implementations, one or more of the monitoring devices 114 are equipped with a wide-angle lens or a wide-angle collection sensor.

The onboard event recorder 112 can be a part of an onboard computer in the vehicle 110, on a mobile device (e.g., mobile phone, tablet, etc.) of the driver 108 that is in data communication with the one or more monitoring devices 114, or a combination thereof. The onboard event recorder 112 can include a local storage device, where data collected from the one or more monitoring devices 115 is stored for a given amount of time, for example, for a period of 24 hours, 15 minutes, or several weeks, or until a driver (or other user) of the vehicle 110 determines to delete the data from the local storage device. In some implementations, the onboard event recorder 112 may store data collected by the one or more monitoring devices 114 on a cloud-based server.

The one or more monitoring devices 114 can be in communication with the onboard event recorder 112 and the DDDR system 102 through a network, where the network can be configured to enable exchange of electronic communication between devices connected to the network. The network can include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL), radio, television, cable, satellite, or any other delivery or tunneling mechanism for carrying data. The network may include multiple networks or subnetworks, each of which may include, for example, a wired or wireless data pathway. The network may include a circuit-switched network, a packet-switched data network, or any other network able to carry electronic communications (e.g., data or voice communications). For example, the network may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network may include one or more networks that include wireless data channels and wireless voice channels. The network may be a wireless network, a broadband network, or a combination of networks includes a wireless network and a broadband network.

In stage (B) of FIG. 1, the driver 108 of vehicle 110 identifies the dangerous driver 104 and initiates an event using the onboard event recorder 112. An event is an instance of a dangerous driver 104 or hazardous situation that is identified by a driver 108. The initiation of the event by a driver 108 can be through a non-verbal cue, for example, the driver 108 pushing a button (e.g., a button located on a dashboard of the vehicle 110 or on a steering wheel of the vehicle 110). The button for engaging the onboard event recorder 112 can receive one type of press (e.g., a single, long press) to initiate an event, and a second type of press (e.g., a double, short press) to end an event. The button can be a part of a monitoring device 114 (e.g., a dashboard camera), or the button can be a standalone device. The button can be, for example, a soft-key button (e.g., on a screen on the dashboard of the vehicle), a touchscreen button, or a physical button (e.g., a push-button on the steering wheel of the vehicle).

In some implementations, a button or set of buttons can be used by the driver 108 to indicate a severity of the event. The button or set of buttons can include a rating system (e.g., red for severe, green for less severe), a number pad (e.g., 1-5 where 1 is low severity and 5 is high severity), words (e.g., low, medium, high). For example, a driver 108 can use a numerical keypad to rate a severity of the dangerous driver event 1-5 by selecting an appropriate numbered button on the numerical keypad.

In some implementations, an initiation of an event by the driver 108 is through a verbal cue spoken by the driver 108. The initiation can be recorded by an audio sensor, e.g., microphone, of the one or more monitoring devices 114. A verbal cue can be a spoken command 116 "The red car on the right is driving dangerously" from the driver 108 specifying a dangerous driver 104 of vehicle 106. Natural language processing can be performed (e.g., by the onboard event recorder 112) on the spoken command 116 to determine that the driver 108 would like to initiate an event. The verbal cue can include details about the dangerous driver 104 including position relative to the driver 108, details about the vehicle 106 (e.g., appearance of the vehicle 106), activity details (e.g., what the dangerous driver is doing), note nearby landmarks, or the like. The driver 108 can provide license plate information, year/make/model information for the vehicle 106 that may help identify the vehicle 106 of the dangerous driver 104.

In some implementations, a driver 108 can specify (e.g., through verbal command) a degree of severity of the dangerous driver 104. The driver 108 can specify a severity using a rating system (e.g., 1-10), a description of the event (e.g., "this is a high-priority event), or through the language used by the driver 108 when providing the verbal command. For example, a driver 108 stating "I think the dangerous driver is going to kill someone" can be processed using natural language processing and classified (e.g., by the onboard event recorder or the DDDR system 102) as a high-priority event.

In some implementations, the button can include two-way audio that allows the driver 108 to be connected directly to an emergency responder to describe the dangerous driver events in more detail. Audio recordings of the driver 108 about the dangerous driver 104 can be uploaded to a cloud-based system and made available, for example, to a local police authority.

In some implementations, the initiation of an event can be a combination of one or more verbal cues and one or more non-verbal cues (e.g., pushing a button). In one example, a driver 108 can initiate an event by selecting a button and providing additional information for the initiation of the event through a verbal command. The additional information provided can include a description of the event (e.g., "there is a blue car swerving in the HOV lane") and other identifying features (e.g., "the license plate is ABC 123").

In some implementations, a button can communicate to a cloud-based server about the event via cellular, satellite, or Bluetooth link from a user's phone. The button may be locally connected to one or more recording devices, e.g., cameras, via a wireless (e.g., Wi-Fi, BlueTooth, etc.) or wired connection, or may be connected through a cloud-to-cloud network having separate communication paths from car to cloud.

In stage (B) of FIG. 1, the onboard event recorder 112 collects event data 113 (e.g., image data, GPS data, etc.) for the initiated event. The onboard event recorder 112 can include image detection software 118 and can pre-process image data collected by one or more monitoring devices 114.

In some implementations, the onboard event recorder 112 can use image detection software 118 and natural language processing of verbal commands from the driver 108 to determine if the vehicle and/or hazard of interest is within a field of view of the monitoring device 114. For example, the driver 108 can provide a verbal command "the green truck is driving erratically" such that onboard event recorder, e.g., using image detection software, will determine if the camera is currently capturing a "green truck driving erratically" in the collected image data.

In some implementations, image detection software 118 can utilize one or more object models (e.g., vehicle models), color matching, or the like, to determine if the object of interest is in the field of view of the monitoring device 114. For example, the driver 108 can provide a verbal command "the green truck is driving erratically" such that the image detection software 118 will look for truck-shaped objects (e.g., using one or more vehicle models) and then determine if any of the truck-shaped objects are green in color, or vice versa. Based on what objects are detected in the field of view of the monitoring device 114, the image detection software 118 can generate a likelihood score that the "green truck" mentioned by the driver 108 is within the field of view of the monitoring device 114. For a likelihood score that is below a threshold score, the onboard event recorder 112 can provide commands to the monitoring device to scan a broader field of view, e.g., by zooming out, moving the monitoring device position, etc., until the image detection software 118 returns a likelihood score that is above the threshold score (e.g., likely a match). If the image recognition software 118 is unable to detect the "green truck", the onboard event recorder 112 can request additional information from the driver 108 or provide an error message (e.g., flashing light, audible alert, verbal alert) to the driver 108 if the "green truck" is not detected by the monitoring devices 114.

In some implementations, the onboard event recorder 112 can use OCR processing of image data to determine if there is text-based information included in the image data, for example, tag information, bumper stickers, vehicle make/model, or the like. For example, an image of the back of the vehicle 106 may include a license plate, a bumper sticker, and a make of the vehicle that can all be used to identify the vehicle 106.

The onboard event recorder 112 collects event data 113 for the event and uploads the event data 113 to the DDDR system 102. In one example, the onboard event recorder 112 may collect an initial set of data descriptive of the event prior to uploading the event data 113 descriptive of the event to the DDDR system 102, followed by periodic updates of event data 113 for the event. In another example, the onboard event recorder 112 may upload event data 113 descriptive of the event continuously to the DDDR system 102.

In stage (C) of FIG. 1, the DDDR system 102 receives event data 113 descriptive of the event from the onboard event recorder 112 (120). The DDDR system 102 can receive event data 113 for a duration of an active event. An event can be active based on a driver-indicated start and finish. For example, the driver 108 can indicate a start of an event by pressing a button a first time, and indicate a termination of the event by pressing the button a second time. An event can be active based on a set period for the event to be active, for example, the event can be active for a duration of 5 minutes, 30 minutes, or 2 hours. An event can be active after initiation by a driver 108 until an emergency service provider (e.g., police dispatch or police officer) indicates that the event is terminated. For example, an event can be considered active until a police dispatcher determines that the event is resolved (e.g., the police has apprehended the dangerous driver 104) or that the event is terminated (e.g., the dispatcher determines not to pursue the dangerous driver 104).

The DDDR system 102 determines, from the uploaded event data 113, an event response (122). An event response can include accessing additional information associated with the event, e.g., determining an identity of the dangerous driver 104 of the vehicle 106. Vehicle registration data 124 (e.g., from a government entity) can be accessed by the DDDR system 102 over the network. A license plate or tag identification detected in the image data for the event and/or from a driver 108 provided license plate number can be used to access vehicle information through the vehicle registration data 124. Vehicle registration data 124 can include vehicle identification numbers (VIN), tag data (e.g., license plates), title information (e.g., owner of the vehicle), drivers licenses, and the like. Vehicle registration data 124 may be accessible, for example, in a public database or through a partnership with a local law enforcement or government (e.g., city, county, state) authority.

In some implementations, a portion or all of the vehicle registration data 124 can be stored locally at a same server hosting the DDDR system 102. For example, the DDDR system 102 may store vehicle registration data 124 for vehicles 106 that are frequently reported for dangerous driving. The vehicle registration data 124 can be used to identify the vehicle 106 used by the dangerous driver 104 and an owner and/or registered driver of the vehicle 106.

In some implementations, the DDDR system 102 can access additional information associated with the event by communicating through the network with a home monitoring system 126 that is associated with a same owner and/or registered driver of the vehicle 106 and/or a same owner and/or registered driver of the vehicle 110. The home monitoring system 126 collects data related to activity in home including tracking drivers (e.g., dangerous driver 104) entering/exiting the home and vehicles (e.g., vehicle 106) arriving/departing the home. Further details related to the home monitoring system 126 are discussed below with reference to FIG. 6.

The home monitoring system 126 tracks and stores data related to driver location 128. Driver location 128 can include information about one or more driver and vehicles that are driven by the one or more drivers. For example, driver location 128 can identify a dangerous driver 104 for a vehicle 106. The driver location 128 can include information about a location of a driver (e.g., the driver 104 is at home or the driver 104 is not at home), and a particular driver 104 left the home in a particular vehicle 106. For example, Driver A may be detected by the home monitoring system 126 leaving the home inside Vehicle B, and the home monitoring system 126 stores this information in the driver location data 128. In another example, Driver C and Driver D may detected by the home monitoring system 126 leaving the home inside Vehicle E, and the home monitoring system 126 stores this information in the driver location data 128.

The DDDR system 102 can determine an event response based in part on an identity of the dangerous driver. For example, a dangerous driver 104 who is determined to be a repeat offender (e.g., has been recorded by the DDDR system 102 in multiple dangerous driving events), may trigger a first type of event response. In another example, a dangerous driver 104 who is determined to be an inexperienced driver (e.g., a teenager) may trigger a second type of event response.

In some implementations, determining an event response includes determining a severity of the event (e.g., an event that poses an immediate danger vs. an annoyance). The DDDR system can prioritize handling of event responses (e.g., which events should be processed first) based in part on the severity of the respective events. Prioritization of the events by severity can reduce load on the DDDR system 102 as well as preventing overwhelming a local authority with alerts.

In some implementations, prioritization of events can include an incidence rate of accidents near the dangerous driver 104. For example, if the dangerous driver 104 is reported in an area that has a high rate of traffic accidents due to poor road conditions, poor visibility, winding roads, etc., the event may be treated with a higher priority in order to prevent a serious accident. A relative density of vehicles in an area (e.g., as reported in real time by the DDDR system 102, third-party map/traffic data, or traffic pattern databases, etc.) can affect a prioritization of a particular event. For example, if there is a dangerous driver 104 on a road that is typically high-traffic, it may be prioritized higher than a dangerous driver 104 on a lower-traffic road. A speed of the dangerous driver's 104 vehicle 106 relative to other vehicles in the area and/or a speed limit of the area can affect the prioritization of the event. For example, higher absolute speeds and/or higher speeds relative to the speed limit by a dangerous driver 104 can be prioritized higher.

In some implementations, the DDDR system 102 can determine if multiple reported events from multiple different driver 108 are a same event (e.g., a same dangerous driver 104 is reported by multiple drivers nearby the dangerous driver 104). The DDDR system 102 can use event data 113 (e.g., image data, geographical data, vehicle registration information) for the multiple events and determine (e.g., through clustering) that multiple different reported events are a same event. The DDDR system 102 can combine all reported events that are determined to be a same event in order to reduce a number of event responses determined the particular event. In one example, a multi-vehicle accident can produce multiple reported events from multiple different vehicles 108. The DDDR system 102 can determine that the multiple reported events are related to a same multi-vehicle accident and combine the multiple reported events and event data 113 from each of the multiple reported events together to generate a single event response.

Determining an event response can include determining a type of response that is required for the particular event. A type of event response can include a type of emergency personnel that is designated to respond (e.g., police, fire marshal, ambulance, tow truck, city sanitation workers, wildlife removal, etc.). For example, a wild deer that is reported on a highway may require a wildlife removal response. In another example, a reckless driver that is reported on a roadway may require a police response. The type of response that is required for a particular event can be determined, for example, using a rule-based system (e.g., speeding drivers should be responded to by police, accidents on the roadside should be responded to by an ambulance).

Determining an event response can include determining a local authority to alert to the event (e.g., which local dispatch should receive an alert for the event). Emergency service provider data 130 and event data 113 (e.g., GPS location and direction of movement of the dangerous driver 104) can be used by the DDDR system 102 to determine a local authority or emergency service provider in a same jurisdiction and/or geographic region as the event. For example, the DDDR system 102 can determine that a dangerous driver 104 is within the city limits of Atlanta, Ga. and determine that the local police authority is Atlanta Police Department. In another example, the DDDR system 102 can determine that a dangerous driver 104 is in Atlanta, Ga. but is driving towards Cobb County, Ga. and will be within Cobb County, Ga. before a police officer can respond such that the local police authority to respond should be the Cobb County Police Department.

In some implementations, a local authority may not be able to arrive at the scene of the dangerous driver event in time to take preventative measures against the dangerous driver. The DDDR system 102 can log the event data for later access by a local authority, e.g., in response to an accident that occurs or a later violation occurrence by a same dangerous driver.

In some implementations, the determined event response can include providing an alert to one or more recipients, e.g., other drivers, pedestrians, cyclists, or the like that are determined to be nearby or geographically proximate, e.g., within a threshold distance of the dangerous driver 104. For example, the one or more recipients can be within a one mile radius, within a 5 mile radius, etc. The alert 138 may provide details warning the other drivers, pedestrians, cyclists, etc., of the presence of the dangerous driver 104 or other hazard and give information related to evasive action or other preventative measures for avoiding the dangerous driver 104 or other hazard. Further details related to providing alerts is discussed below with reference to FIG. 5.

In some implementations, the determined response can include providing an alert to the dangerous driver 104. For example, the DDDR system 102 can use driver location 128 information from the home monitoring system 126 to identify the dangerous driver 104 and provide an alert or communication to the dangerous driver 104. The home monitoring system 126 can alternatively or additionally provided an alert or communication to the identified dangerous driver 104 associated with the home monitoring system 126. For example, the DDDR system 102 can provide an alert or communication (e.g., "You have been reported for driving dangerously") to the dangerous driver 104, for example, through an application environment for an application on the dangerous driver's 104 mobile phone (e.g., an Alarm.com application), or through an onboard computer for the vehicle 106 (e.g., text-to-speech, pop-up message on a smart dashboard, etc.).

In some implementations, the determined event response can include providing an alert to an owner of the vehicle 106. For example, the DDDR system 102 can use driver location 128 information from a home monitoring system 126 to provide an alert or communication to an owner of the vehicle 106 that has been reported as driving dangerously. A dangerous driver 104 may be a user of a ride sharing service or an inexperienced driver (e.g., a teenage driver) who is driving vehicle 106 that belongs to an owner. The DDDR system 102 can provide an alert or notification, for example, through an application environment of an application (e.g., an Alarm.com app), text message/SMS, robocall, etc., to the owner of vehicle 106 that a driver of their vehicle 106 has been reported as driving dangerously.

In some implementations, the determined event response can include providing an alert to one or more passengers of a ride share involving vehicle 106. The DDDR system 102 can provide an alert (e.g., through an Alarm.com application and/or a ride sharing application) to one or more current or future passengers of a ride share that includes the dangerous driver 104 of vehicle 106. For example, a passengers waiting to be picked-up by a vehicle 106 that has been reported as driving dangerously can receive an alert "Your driver has been reported as driving dangerously." In another example, a current passenger of a ride-share service can report the driver of the vehicle 106 as driving dangerously.

The DDDR system 102 generates an alert based on the event response to the dangerous driver event (132). An alert is a notification that is provided to one or more emergency service providers to notify the emergency service provider of the dangerous driver 104. The alert can include event data 113, for example, image data, metadata (e.g., location information, direction of travel of the dangerous driver 104), a visualization (e.g., a three-dimensional rendering of the vehicle 106), or other information to assist in locating the dangerous driver 104 or hazard.

Based on the determined event response, the alert is provided to an emergency service provider (134). The emergency service provider can include an emergency services dispatch 136 that can route the alert to an emergency service provider (e.g., a police officer) that is determined by the emergency services dispatch 136 to be nearby and/or the appropriate responder for the particular dangerous driver event.

In stage (D) of FIG. 1, the DDDR system 102 provides an alert 138 to an emergency services dispatch 136. The emergency services dispatch 136 can be selected by the DDDR system 102 based in part on a location and direction of movement of the dangerous driver 104. For example, the dangerous driver 104 is determined to be within a jurisdiction of a particular city emergency dispatch network, and the alert is provided to the particular city emergency dispatch network.

In some implementations the DDDR system 102 can provide an alert 138 to multiple different emergency service dispatchers 136, for example, including one or more emergency service dispatch 136 for an area where the dangerous driver 104 is currently located, as well as one or more emergency services dispatch 136 for an area where the dangerous driver 104 may be headed.

In some implementations, the DDDR system 102 can provide the alert directly to an emergency service provider 140, for example, when the DDDR system 102 is implemented as part of an emergency service dispatch 136 system.

In some implementations, emergency service dispatchers 136 can be a third-party centralized station, including live human operators to determine a particular local authority to provide the emergency service provider 140 with appropriate alerts 138 and information. The emergency service dispatcher 136 can received video footage, event metadata, and other related data from the DDDR system 102 and process the received data into a format that is accessible to a local authority, e.g., text-based police report, audio report for a radio-alert, etc.

In stage (E) of FIG. 1, an alert 138 is provided from an emergency services dispatch 136 to an emergency service provider (e.g., a police officer) 140. The alert 138 as depicted in FIG. 1 includes a visual representation (e.g., image or video data) of the dangerous driver, location information, and vehicle/driver information. Vehicle/driver information can include, for example, a license plate, citation/arrest history for the driver, concealed handgun licenses, an identification photo (e.g., from DMV records) of the dangerous driver, and the like. The alert 138 may be presented to a driver of the police car 140 on a screen (e.g., a smart dashboard, onboard computer, etc.), and/or can be a verbal alert. Location information can include a timestamp, GPS coordinates, speed, direction of motion, and the like.

In some implementations, alert 138 can include the report including details provided by driver 108 (e.g., "a green truck is driving erratically"), for example, in the original audio as provided by driver 108, in the form of a transcript that can be read, or text-to-speech in audio format. A severity report by the driver 108 and/or determined by the DDDR system 102 can be provided in the alert 138, including suggested interventions and/or tactics to handling the situation.

In some implementations, alert 138 can include contact information for the driver 108 who reported the dangerous driver event. For example, the police officer 140 can select to contact the driver 108 to acquire more details during the event and/or after the event has taken place (e.g., to receive a witness statement).

In some implementations, location information provided in the alert 138 can be used as input into a mapping or location-tracking service. For example, location information can be added to a map service to determine a route between the dangerous driver 104 or hazard and the emergency service provider 140.

In some implementations, additional event data 113 can be sent to the emergency service provider from the DDDR system 102 while the event is in process, for example, additional video data or additional location information. The additional event data 113 can be real-time event data. For example, if a dangerous driver 104 changes direction of travel, an update can be collected in the event data 113 from the driver 108 and provided to the DDDR system 102, which in turn can provide the update to the emergency service dispatch 136 and/or the emergency service provider 140.

In some implementations, event data 113, reported events, information related to dangerous drivers 104, information related to reporting drivers 108, and the like can be stored in a database for future reference to determine, for example, repeat offenders. Event reporting can also be tracked (e.g., drivers 108 who regularly report events) to determine the reliability of different reported events. For example, a person who regularly reports reliable events can have an associated higher reliability score than a person who regularly reports events and overstates or is misleading about the event (e.g., reports someone who has not violated traffic laws).

A driver 108 can indicate the end of an event by providing a verbal or non-verbal signal, for example, speaking a command "the dangerous driver has stopped" or pressing a button on the dashboard. At the end of the event, collection of event data 113 for the event by the onboard event recorder 112 is terminated. An alert notifying the end of an event can be provided by the DDDR system 102 to the respective emergency service dispatch 136 and/or emergency service providers 140 who previously received the alert 140 related to the event.

In some implementations, the end of an event is when the dangerous driver 104 has stopped the dangerous behavior or has stopped their vehicle 106. The end of the event can also be when the reporting driver 108 no longer has view or is no longer driving in a same direction as the dangerous driver 108. For example, the driver 108 may indicate an end of the reported event when the dangerous driver has pulled over on the side of the road. In another example, the driver 108 may indicate an end of the reported event when the driver 108 no longer has a line of sight of the dangerous driver (e.g., the driver 108 took an exit off a highway while the dangerous driver 104 continued on the highway).

Figure 2:
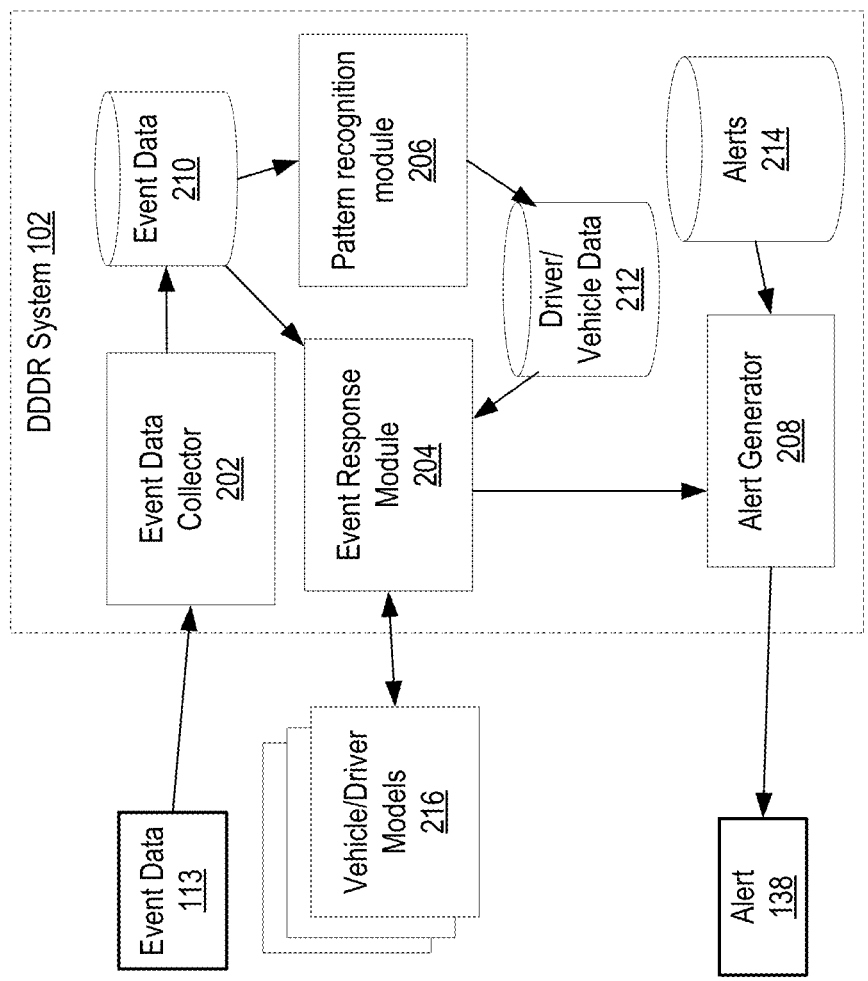
FIG. 2 is a block diagram of an example dangerous driver detection and response system.

FIG. 2 is a block diagram of an example DDDR system 102. The DDDR system 102 may be hosted on one or more local servers, a cloud-based service, or a combination thereof. The DDDR system 102 includes an event data 113 collector 202, an event response module 204, a pattern recognition module 206, and an alert generator 208. Additionally, the DDDR system 102 includes one or more databases, for example, for storing event data 210 (e.g., event data 113), driver/vehicle data 212, and alert data 214. Although described herein as an event data collector 202, an event response module 204, a pattern recognition module 206, and an alert generator 208, the different functions of the DDDR system 102 may be performed by more or fewer sub-systems within the DDDR system 102. The DDDR system 102 receives, as input, event data 113 from the one or more monitoring devices 114 for the vehicle 110, and provides, as output, one or more alerts 138. The one or more alerts 138 can be provided, for example, to an emergency services dispatch 136 and/or an emergency service provider 140.

The DDDR system 102 can include vehicle/driver models 216, which can be trained using neural networks through unsupervised learning using event data 113 collected by the event data 113 collector 202 from the monitoring devices 114 of vehicle 110.

In some implementations, the vehicle/driver model 216 can be a rule-based model, where one or more rules can specify if a driver is a dangerous driver 104. Details of the training of the vehicle/driver models 216 is described in more detail below. The set of rules for the vehicle/driver model 216 can include, for example, rules defining traffic laws (e.g., "vehicle should stay within the designated lane," or "vehicles should stop at a red stoplight"), or rules defining normal driver behavior (e.g., "driver has both hands on the steering wheel," or "driver signals before changing lanes") such that a violation of one or more rules can be used to identify/confirm a dangerous driver event.

A violation of a particular rule can result in a pre-determined response, where a type of response can depend, for example, on a severity of the rule violation, a number of rules violated, whether the rule violated is a traffic violation or a standard driving norm, or the like. In one example, a violated rule can be a traffic violation: "speeding greater than 10 miles an hour over speed limit" which can trigger a pre-determined response to alert local authorities, e.g., police. In another example, a violated rule can be "driver only has one hand on the steering wheel" which can trigger a pre-determined response to one or more relevant, non-emergency users, e.g., an owner of the vehicle.

The event data collector 202 can receive uploaded event data 113 from an onboard event recorder 112. In some implementations, the event data collector 202 can request event data 113 from one or more onboard event recorders 112 and/or from other sources of event data. Collection of event data from multiple different sources is discussed in more detail below with reference to FIG. 5. The collected event data can be stored as stored event data 210. The stored event data 210 can be stored (e.g., stored in a cloud-based server) for a determined amount of time, for example, for two hours, for one week, or for a year. An amount of time that the stored event data 210 is stored can depend on cost-considerations, duration of an event, or the like.

The pattern recognition module 206 can use the stored event data 210 to generate and train one or more vehicle/driver models 216 through supervised learning. Stored event data 210 can be labeled, e.g., by human experts, to identify dangerous drivers and used to train the one or more vehicle/driver models 216. Unsupervised learning can be used to train and/or refine the one or more vehicle driver models 216, for example, to generate site-specific vehicle/driver models 216 for a particular vehicle make/model, a particular type of driver, or a particular roadway section (e.g., intersection, stretch of highway).

In some implementations, the pattern recognition module 206 can generate vehicle/driver models 216 from stored event data 210 that are specific to particular dangerous drivers, e.g., repeat offenders. The DDDR system 102 can use the specific vehicle/driver models 216 to detect and identify the repeat offenders who may be frequently reported as driving dangerously.

In some implementations, multiple drivers 108 can initiate respective events each reporting a same dangerous driver 104. The DDDR system 102 can use vehicle/driver models 216, location information, and other metadata provided by each of the multiple drivers to determine that the dangerous driver event is a same event in order to combine the reported events into one event (e.g., to prevent flooding a dispatcher with multiple reports). For example, multiple reports of a "green truck" in a same area (e.g., 5 mile radius) reported within 10 minutes of each other may be combined into one event. Update alert 138 can be provided to the emergency services dispatch to notify that there are continued reports of the same dangerous driver 104, e.g., with updated location information.

Figure 3:
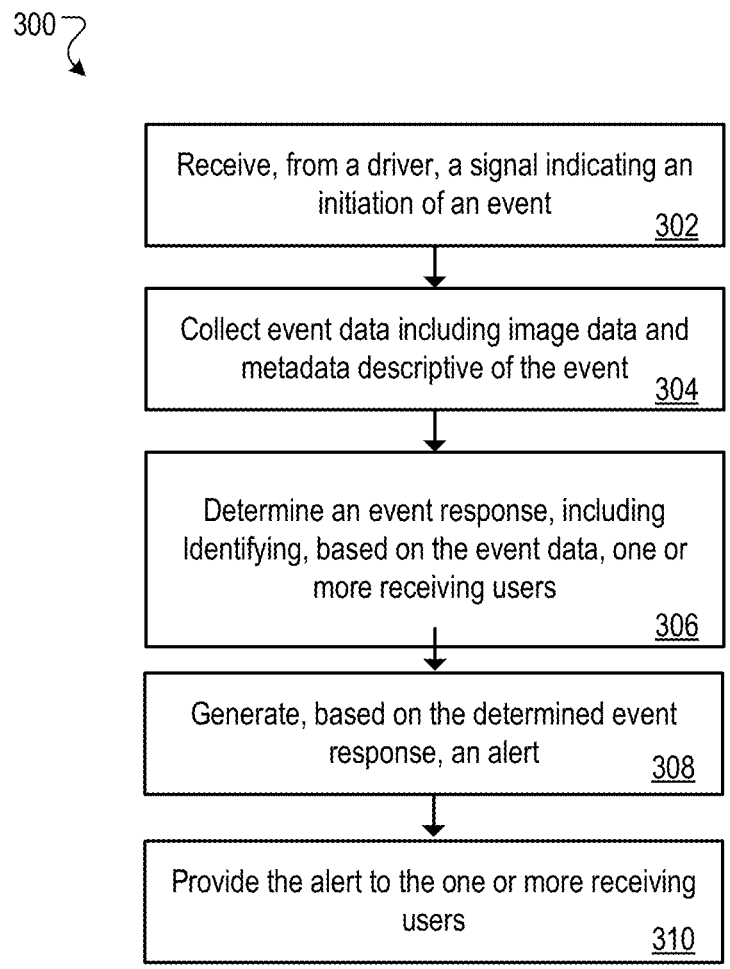
FIG. 3 is process flow diagram of an example process of a dangerous driver detection and response system.

FIG. 3 is process flow diagram of an example process 300 of the DDDR system 102.

A signal is received from a driver 108 indicating an initiation of an event (302). The signal can be, for example, a verbal or non-verbal cue from the driver 108. A signal initiated the event can the driver pushing a button that triggers an onboard event recorder 112 to initiate an event, or can be a driver speaking a verbal command that triggers an onboard event recorder 112 to initiate an event. Initiation of an event can include initiating a collection of event data 113. In some implementations, an onboard event recorder 112 can be continuously or periodically collecting event data 113, and in response to an initiation of an event, begin labeling the data collected by the onboard event recorder 112 as event data 113 for the event.

Event data 113 is collected including image data and metadata descriptive of the event (304). Metadata can include location information, direction of motion of the dangerous driver, speed of the dangerous driver, and the like. The event data 113 can be collected by the onboard event recorder 112 from one or more monitoring devices 114, for example, cameras, LIDAR sensors, speedometers, GPS tracking devices, etc. The collected event data 113 is provided to the DDDR system 102.

An event response is determined including identifying one or more receiving users based on the event data (306). The DDDR system 102 can determine an appropriate event response based on the event data received for the event. A type of event, (e.g., a hazard in the roadway vs. a drunk driver) can have different determined event responses. A location of the event (e.g., within a city jurisdiction vs. within state or highway patrol jurisdiction) can influence the event response.

Based on the determined event response, an alert is generated (308). Alert 138 can include, for example, image/video data, vehicle and driver information, tag registration information, geographical location, description of the event (e.g., what the dangerous driver is doing), and the like. The alert 138 can be provided, for example, to a mobile device, an onboard event recorder 112, and the like. The alert 138 can be provided to a driver in audio format, visual format, or a combination thereof.

The alert is provided to the one or more receiving users (310). One or more receiving users can include emergency services dispatch 136, emergency service provider 140, and/or other drivers, pedestrians, cyclists, etc., that are within an area of the event. In one example, drivers that are determined to be nearby, e.g., geographically proximate within a threshold distance of, the dangerous driver can receive an alert about the dangerous driver, to warn the nearby drivers of the presence of the dangerous driver. In some implementations, one or more other drivers, pedestrians, cyclists, etc., can receive an alert related to the dangerous driver where the alert includes a request for the receiving driver/pedestrian/cyclist to provide additional event data (e.g., engage respective onboard event recorders 112 to record the dangerous driver). Details related to collecting event data from one or more receiving users is described further with reference to FIG. 5 below.

Figure 4:
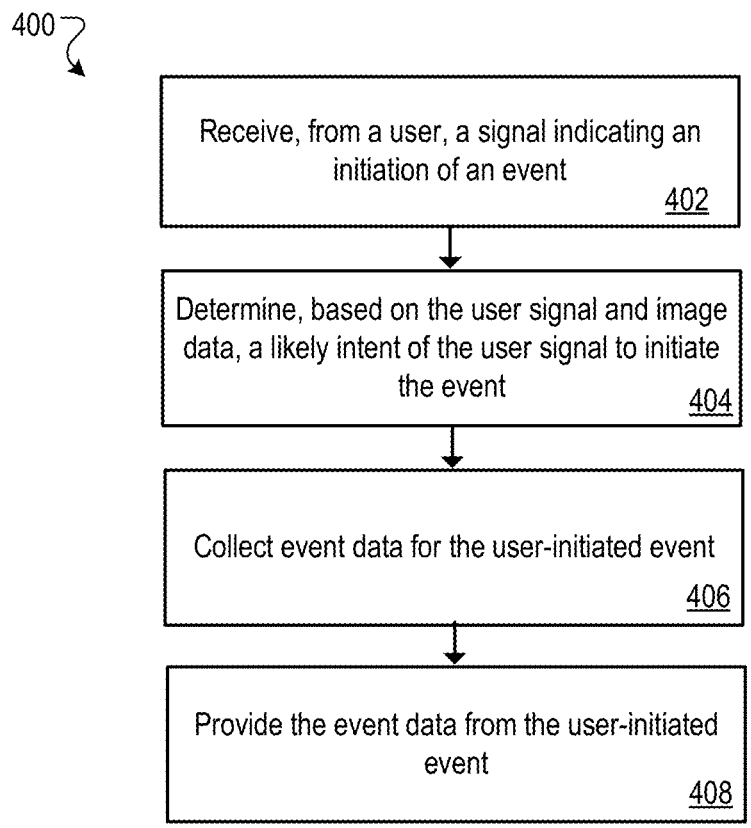
FIG. 4 is a process flow diagram of another example process of a dangerous driver detection and response system.

FIG. 4 is a process flow diagram of another example process 400 of the DDDR system 102. A signal indicating an event is received from a user (402). A signal indicating an event can be a user pressing a button on an onboard event recorder 112. A signal indicating an event can be a verbal command from a user to an onboard event recorder 112, for example, where a user provides a verbal command "there is a dangerous driver to my left weaving between lanes of traffic." The signal indicating the event can include one or more details about the event, for example, a location of the event (e.g., "in front of me," "next to me," "in the HOV lane"), details about a hazard or vehicle (e.g., "the car is blue," "there is a mattress on the road"), and/or other descriptors that may assist an onboard event recorder 112 to identify the event.

A likely intent of the user signal is determined based on the user signal and image data to initiate the event (404). The onboard event recorder 112 can collect image data from one or more monitoring devices 114 (e.g., cameras, LIDAR detects, etc.) and pre-process the image data to determine what the driver 108 may be indicating with the user signal. In one example, the onboard event recorder can use image-processing software to locate and identify objects (e.g., a vehicle) in the captured image data. The onboard event recorder may use, for example, one or more classifiers and/or machine learning models to identify objects in the image data.

In some implementations, the onboard event recorder 112 can use natural language processing to determine a likely intent of the user signal from a verbal command from driver 108. For example, audio analytics with natural language processing can be used to analyze the spoken user signal of the driver 104, which can include a wake-up word (e.g., "DDDR", "Begin Alert", etc.) that is unique to the onboard event recorder 112. The natural language processing can determine a meaning of the driver's 108 spoken user signal including basic speech recognition transcription. The natural language processing can additionally attempt to understand severity, priority, and other contextual information as reported in the user signal given by the driver 108.

In some implementations, the onboard event recorder 112 performs some or all of image processing and natural language processing locally (e.g., on a mobile phone, an onboard computer for the vehicle). The onboard event recorder 112 may instead or additionally push some or all of the event data and/or verbal commands to a cloud-based server that can perform the image processing and natural language processing remotely.

The likely intent of the user can be, for example, to report a dangerous driver that is nearby the user (e.g., driver 108).

In another example, a likely intent of the user can be to report a hazardous condition (e.g., black ice on a roadway). The onboard event recorder 112 can determine, using image data collected from a monitoring device 114 and natural language processing of verbal commands provided from the user (e.g., "the red car to my right is being reckless!") that the vehicle of interest is located at a particular relative orientation of the monitoring device 114. The onboard event recorder 112 may provide commands to one or more monitoring devices 114, e.g., positioning instructions.

After determining the likely intent of the user, event data 113 is collected for the user-initiated event (406). Event data 113 can include, for example, image data, GPS data, LIDAR data, and the like. The event data 113 can be stored locally, for example, at a local server onboard the vehicle 110. Event data 113 can be collected for a set period, for example 10 minutes, 20 minutes, etc. Event data 113 can be collected from a point in time when driver 108 initiates an event until a point in time when the driver 108 indicates an ending of the event. For example, a driver 108 may indicate that they are no longer near the dangerous driver 104 (e.g., pulled off the highway), and the event data collection is terminated. Event data 113 can be collected from a point in time when the driver 104 initiates the event until a point in time when an emergency service provider 140 (e.g., police) indicates that the event has been terminated (e.g., the dangerous driver 104 has been pulled over).

In some implementations, the event data 113 is collected continuously. The event data 113 can instead be collected periodically (e.g., every 30 seconds, acquire an image). A frequency at which event data 113 is collected can depend in part on local and/or cloud storage capacity, data upload capabilities, cost considerations, and the like.

The event data is provided from the user-initiated event (408). In some implementations, event data 113 can be pushed to the DDDR system 102 periodically (e.g., every 2 minutes, every 10 minutes, etc.). The event data 113 can be provided to the DDDR system 102 over a network. In some implementations, event data 113 can be provided directly to an emergency services dispatch 136 and/or an emergency service provider 140. In one example, event data 113 collected by a driver 108 can be provided to a police office 140 responding to the event in real-time such that the police office 140 receives updated event data 113 during the process of responding to the reported event.

Figure 5:
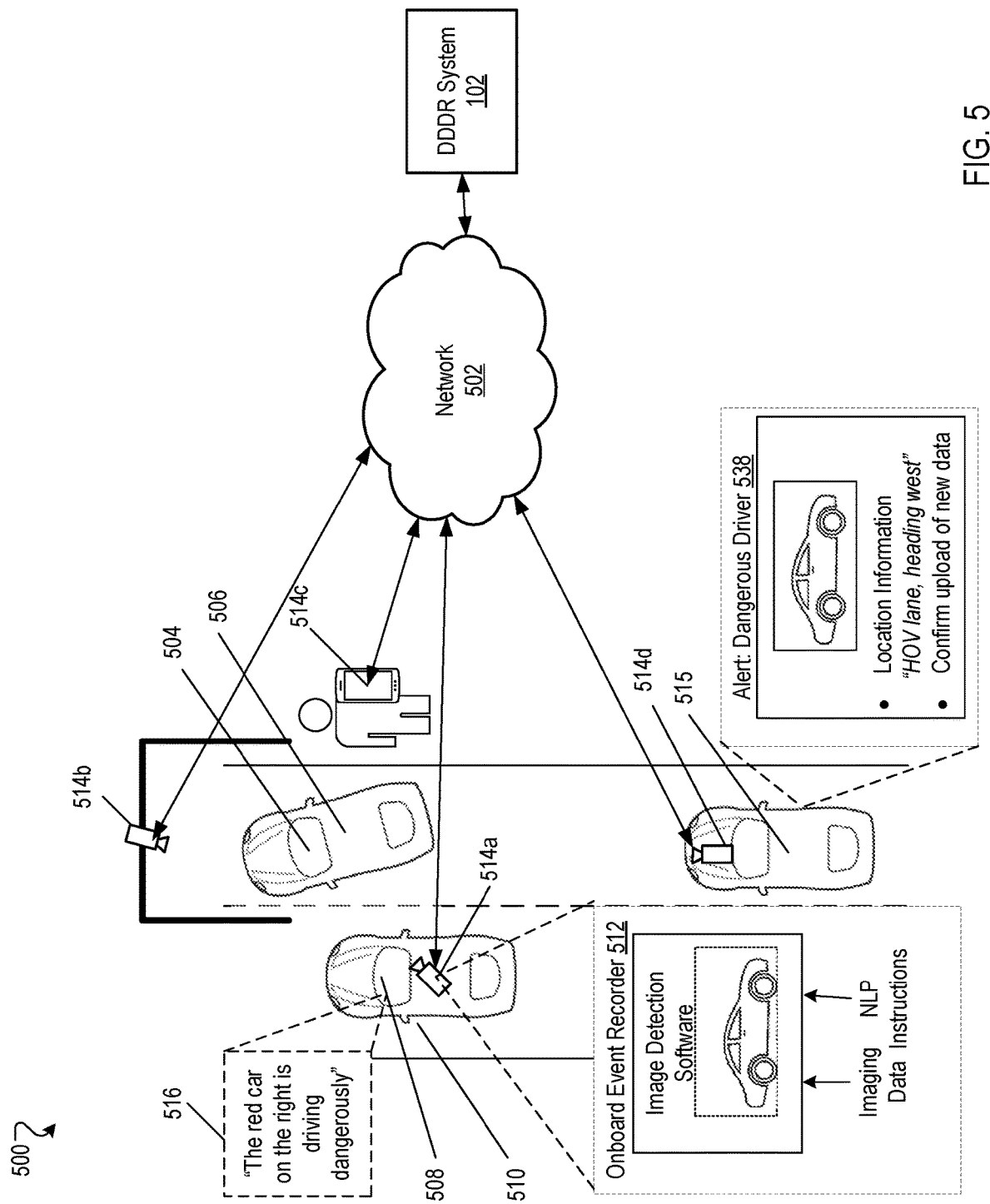
FIG. 5 is another example operating environment for a dangerous driver detection and response system.

FIG. 5 is another example operating environment 500 for the DDDR system 102. As depicted in FIG. 5, a dangerous driver 504 of a vehicle 506 can be reported by a driver 508 of a vehicle 510. Driver 508 can initiate an event through an onboard event recorder 512, where event data can be collected by one or more monitoring devices 514a (e.g., dashboard camera, LIDAR sensors, GPS device, etc.). Event data for the event can be provided to the DDDR system 102 through the network 502.

In some implementations, the DDDR system 102 can determine to collect additional event data from other local (e.g., geographically relevant) sources. For example, stationary monitoring devices 514b nearby the dangerous driver 104 (e.g., traffic cameras, security cameras of nearby businesses, etc.), mobile devices 514c belonging to nearby pedestrians (e.g., mobile phones), or monitoring devices 514d for other vehicles 515, e.g., other cars, traffic helicopters, drones, autonomous vehicles, etc., nearby the dangerous driver 504. One or more of the other monitoring devices 514b, 514c, and 514d can be determined to be geographically proximate e.g., within a threshold distance of, the dangerous driver 504 using GPS location information for the one or more other monitoring devices. A threshold distance can distance between the dangerous driver event and the other local sources of event data or recipients where the additional event data collected from the other local sources could be relevant to tracking the dangerous driver event. For example, the DDDR system 102 can use GPS location data for a vehicle 515 and GPS location data for the dangerous driver vehicle 510 and/or GPS location data for vehicle 510 to determine that the vehicle 515 is within a threshold distance the dangerous driver 504, e.g., within 50 feet, 100 feet, 0.5 miles. In another example, a traffic camera 514b can be determined to be within a path that the dangerous driver 504 is taking, e.g., using the GPS location information for the dangerous driver 504 that is recorded by the onboard event recorder 512 on vehicle 510.

In some implementations, the DDDR system 102 can determine which monitoring devices 514b, 514c, and 514d to engage through alert 538 using, for example, map data, local traffic laws, or the like, for an area surrounding the dangerous driver 504. For example, an alert 538 may be provided to drivers of vehicles including monitoring devices 514d that are on a same side of a divided highway, but not to drivers of vehicles including monitoring devices 514d that are on an opposite side of the divided highway. In another example, the alert 538 may be provided only to drivers of vehicles including monitoring devices 514d that are moving in a same direction as the dangerous driver 504, and not to drivers of vehicles including monitoring devise 514d that are moving in cross-traffic.

In some implementations, the DDDR system 102 can prioritize which monitoring devices 514b, 514c, and 514d to engage through alert 538 based on location, field of view of the respective devices, and/or available bandwidth of the DDDR system 102. The DDDR system 102 can prioritize monitoring devices with higher camera resolution, how quickly the monitoring devices can be re-positioned to capture the dangerous driver, a current operating mode of the monitoring device (e.g., "sleep mode" vs. "alert/active mode"), an area covered by the field of view of the monitoring device, etc.

In some implementations, the DDDR system 102 can provide an alert 538 to one or more local sources including one or more other monitoring devices 514b, 514c, and 514d where the alert 538 includes metadata descriptive of the dangerous driver 504 and instructions to collect event data. In one example, an alert 538 can be provided to a mobile phone 514c including metadata to assist a user of the mobile phone to detect and collect data that is relevant to the event. Metadata can include a description of the dangerous driver 504 and/or vehicle 506, location information (e.g., "HOV lane, heading west"), or image data of the dangerous driver 504, the vehicle 506, or other nearby landmarks. Alerts 538 can be provided, for example, through an application running on a mobile device, a web browser, an SMS/text message, in a pre-recorded phone message (e.g., a "robocall"), or through an emergency services dispatcher.

In some implementations, alert 538 can be provided through an application on a user's mobile phone, where the user can additionally use a graphical user interface (GUI) of the application to collect the event data. For example, the GUI can include "point-and-shoot" guidance for capturing event data, options for providing audio/text-based details related to the dangerous driver event, and the like.

In another example, an alert 538 can be provided to automated monitoring devices 514b, e.g., traffic cameras, including commands to collect data. Commands to monitoring devices 514b can additionally include instructions to adjust a field of view of the particular camera such that the monitoring device 514b is positioned to capture the dangerous driver 504.

In some implementations, alerts 538 can be provided to a set of monitoring devices 514b, 514c, 514d as the dangerous driver 504 is moving past the respective locations of the monitoring devices. For example, a set of adjacent traffic cameras positioned along a stretch of highway may be engaged to capture event data, where each traffic camera 514b receives an alert including instructions to collect event data as the dangerous driver 504 is determined to be within range (e.g., within a field of view) of each respective traffic camera 514b.

In some implementations, each additional monitoring device 514b, 514c, 514d that receives an alert 538 to collect event data can initiate a sub-event of the event and collect the relevant event data to provide to the DDDR system 102. The DDDR system 102 can combine the event data received from each of the sub-events initiated monitoring devices 514b, 514c, and 514d with the event data received from the monitoring devices 514a into a single event to generate alerts (e.g., alert 138) to provide to emergency services dispatch (e.g., emergency services dispatch 136). Periodic updates including real-time event data can be provided to one or more of the monitoring devices 514a, 514b, 514c, and 514d.

DDDR system 102 can determine that one or more of the monitoring devices 514a, 514b, 514c, and 514d is out of range of the dangerous driver 504 (e.g., the monitoring device is not located within 50 feet of the dangerous driver 504) and stop collecting event data for the particular monitoring device.

In some implementations, the DDDR system 102 can engage with an onboard recording system 512 through network 502. A driver of a vehicle including the onboard event recorder can provide authorization to initiate collecting event data from the monitoring device 514d. In one example, an audible alert 538 is provided and the driver can provide a verbal authorization to engage the onboard recorder system in response. In another example, a driver 508 can provide pre-authorization for the DDDR system 102 to collect data from one or more monitoring devices 514a in the case that vehicle 510 is determined to be within range of a dangerous driver event.

In some implementations, the DDDR system 102 can provide an alert 138 to a user device 514c, for example, through a SMS/text message, through an application running on the user device 514c, through a robocall, or the like. The one or more user devices 514b may include devices that host and display an application including an application environment. For example, a user device 514b is a mobile device that hosts one or more native applications that includes an application interface (e.g., a graphical-user interface (GUI)) through which a user of the user device 514b may interact with the DDDR system 102 and/or the home monitoring system 126. The user device 514b may be a cellular phone or a non-cellular locally networked device with a display. The user device 514b may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 514*b* may perform functions unrelated to the DDDR system 102, such as placing personal telephone calls, playing music, playing video, displaying pictures, browsing the Internet, maintaining an electronic calendar, etc.

The application refers to a software/firmware program running on the corresponding mobile device that enables the user interface and features described throughout, and is a system through which the DDDR 102 may communicate with a user (e.g., a driver, a pedestrian, a cyclist, etc.). The user device 514*b* may load or install the application based on data received over a network or data received from local media. The application runs on mobile devices platforms, such as iPhone, iPod touch, Blackberry, Google Android, Windows Mobile, etc., and enables the user device 514*b* to receive and process event data and alerts 538 from the DDDR system 102 over the network 502.

In some implementations, the application is a part of a home monitoring application for the home monitoring system 126. For example, a user of a user device 514*b* may receive alerts 538 through an application that is related to the DDDR system 102 and notifications from the home monitoring system 126 that are related to home monitoring (e.g., home security).

Figure 6:
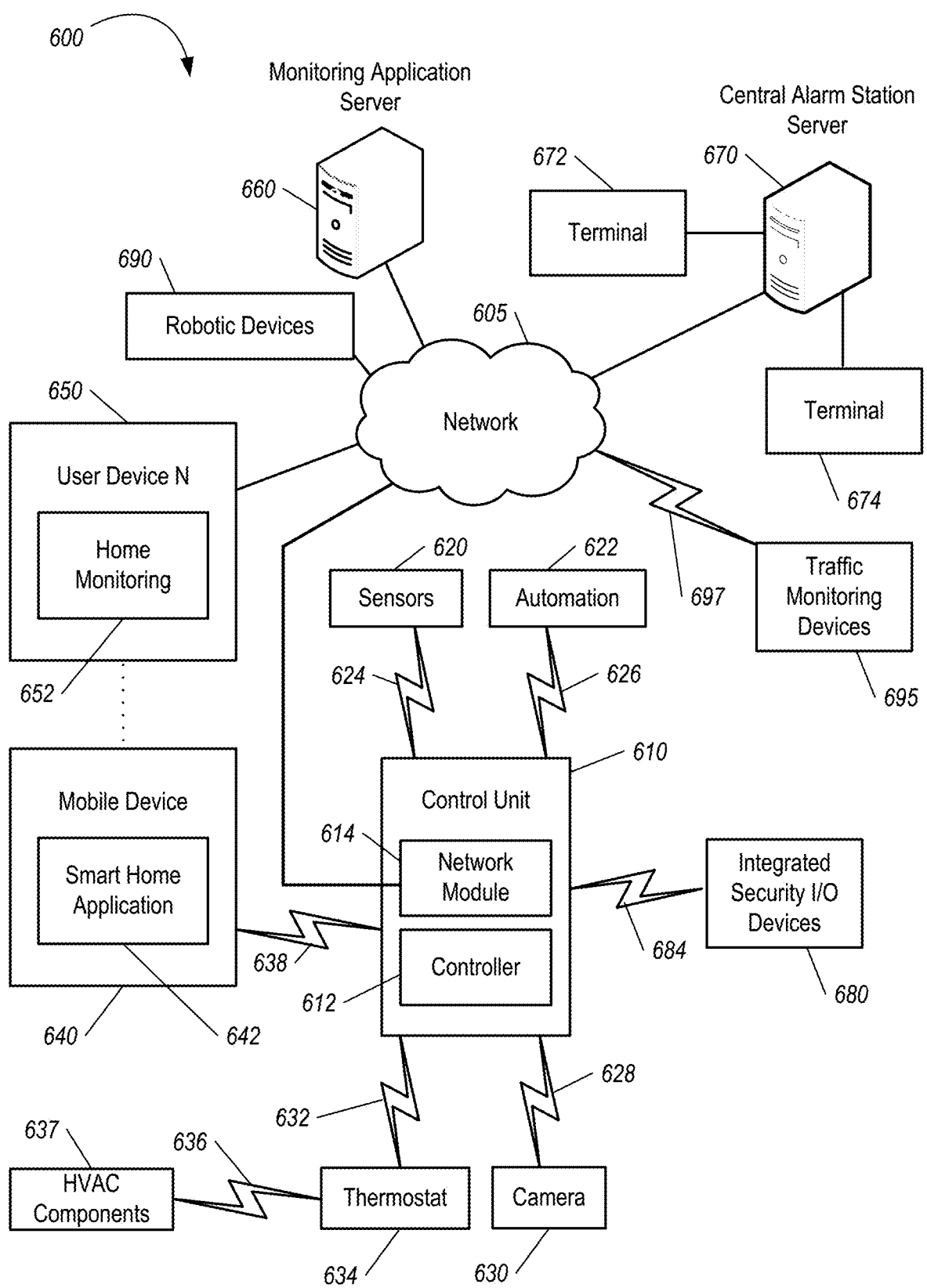
FIG. 6 is a diagram illustrating an example home monitoring system.

FIG. 6 is a diagram illustrating an example of a home monitoring system 600. The electronic system 600 includes a network 605, a control unit 610, one or more user devices 640 and 650, a monitoring server 660, and a central alarm station server 670. In some examples, the network 605 facilitates communications between the control unit 610, the one or more user devices 640 and 650, the monitoring server 660, and the central alarm station server 670.

The network 605 is configured to enable exchange of electronic communications between devices connected to the network 605. For example, the network 605 may be configured to enable exchange of electronic communications between the control unit 610, the one or more user devices 640 and 650, the monitoring server 660, and the central alarm station server 670. The network 605 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 605 may include multiple networks or subnetworks, each of which may include, for example, a wired or wireless data pathway. The network 605 may include a circuit-switched network, a packet-switched data network, or any other network able to carry electronic communications (e.g., data or voice communications). For example, the network 605 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 605 may include one or more networks that include wireless data channels and wireless voice channels. The network 605 may be a wireless network, a broadband network, or a combination of networks including a wireless network and a broadband network.

The control unit 610 includes a controller 612 and a network module 614. The controller 612 is configured to control a control unit monitoring system (e.g., a control unit system) that includes the control unit 610. In some examples, the controller 612 may include a processor or other control circuitry configured to execute instructions of a program that controls operation of a control unit system. In these examples, the controller 612 may be configured to receive input from sensors, flow meters, or other devices included in the control unit system and control operations of devices included in the household (e.g., speakers, lights, doors, etc.). For example, the controller 612 may be configured to control operation of the network module 614 included in the control unit 610.

The network module 614 is a communication device configured to exchange communications over the network 605. The network module 614 may be a wireless communication module configured to exchange wireless communications over the network 605. For example, the network module 614 may be a wireless communication device configured to exchange communications over a wireless data channel and a wireless voice channel. In this example, the network module 614 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 614 also may be a wired communication module configured to exchange communications over the network 605 using a wired connection. For instance, the network module 614 may be a modem, a network interface card, or another type of network interface device. The network module 614 may be an Ethernet network card configured to enable the control unit 610 to communicate over a local area network and/or the Internet. The network module 614 also may be a voice band modem configured to enable the alarm panel to communicate over the telephone lines of Plain Old Telephone Systems (POTS).

The control unit system that includes the control unit 610 includes one or more sensors. For example, the monitoring system may include multiple sensors 620. The sensors 620 may include a lock sensor, a contact sensor, a motion sensor, or any other type of sensor included in a control unit system. The sensors 620 also may include an environmental sensor, such as a temperature sensor, a water sensor, a rain sensor, a wind sensor, a light sensor, a smoke detector, a carbon monoxide detector, an air quality sensor, etc. The sensors 620 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 620 can also include a radio-frequency identification (RFID) sensor that identifies a particular article that includes a pre-assigned RFID tag.

The control unit 610 communicates with the home automation controls 622 and a camera 630 to perform monitoring. The home automation controls 622 are connected to one or more devices that enable automation of actions in the home. For instance, the home automation controls 622 may be connected to one or more lighting systems and may be configured to control operation of the one or more lighting systems. In addition, the home automation controls 622 may be connected to one or more electronic locks at the home and may be configured to control operation of the one or more electronic locks (e.g., control Z-Wave locks using wireless communications in the Z-Wave protocol). Further, the home automation controls 622 may be connected to one or more appliances at the home and may be configured to control operation of the one or more appliances. The home automation controls 622 may include multiple modules that are each specific to the type of device being controlled in an automated manner. The home automation controls 622 may control the one or more devices based on commands received from the control unit 610. For instance, the home automation controls 622 may cause a lighting system to illuminate an area to provide a better image of the area when captured by a camera 630.

The camera 630 may be a video/photographic camera or other type of optical sensing device configured to capture images. For instance, the camera 630 may be configured to capture images of an area within a building or home monitored by the control unit 610. The camera 630 may be configured to capture single, static images of the area and also video images of the area in which multiple images of the area are captured at a relatively high frequency (e.g., thirty images per second). The camera 630 may be controlled based on commands received from the control unit 610.

The camera 630 may be triggered by several different types of techniques. For instance, a Passive Infra-Red (PIR) motion sensor may be built into the camera 630 and used to trigger the camera 630 to capture one or more images when motion is detected. The camera 630 also may include a microwave motion sensor built into the camera and used to trigger the camera 630 to capture one or more images when motion is detected. The camera 630 may have a "normally open" or "normally closed" digital input that can trigger capture of one or more images when external sensors (e.g., the sensors 620, PIR, door/window, etc.) detect motion or other events. In some implementations, the camera 630 receives a command to capture an image when external devices detect motion or another potential alarm event. The camera 630 may receive the command from the controller 612 or directly from one of the sensors 620.

In some examples, the camera 630 triggers integrated or external illuminators (e.g., Infra-Red, Z-wave controlled "white" lights, lights controlled by the home automation controls 622, etc.) to improve image quality when the scene is dark. An integrated or separate light sensor may be used to determine if illumination is desired and may result in increased image quality.

The camera 630 may be programmed with any combination of time/day schedules, system "arming state", or other variables to determine whether images should be captured or not when triggers occur. The camera 630 may enter a low-power mode when not capturing images. In this case, the camera 630 may wake periodically to check for inbound messages from the controller 612. The camera 630 may be powered by internal, replaceable batteries if located remotely from the control unit 610. The camera 630 may employ a small solar cell to recharge the battery when light is available. Alternatively, the camera 630 may be powered by the controller's 612-power supply if the camera 630 is co-located with the controller 612.

In some implementations, the camera 630 communicates directly with the monitoring server 660 over the Internet. In these implementations, image data captured by the camera 630 does not pass through the control unit 610 and the camera 630 receives commands related to operation from the monitoring server 660.

The system 600 also includes thermostat 634 to perform dynamic environmental control at the home. The thermostat 634 is configured to monitor temperature and/or energy consumption of an HVAC system associated with the thermostat 634, and is further configured to provide control of environmental (e.g., temperature) settings. In some implementations, the thermostat 634 can additionally or alternatively receive data relating to activity at a home and/or environmental data at a home, e.g., at various locations indoors and outdoors at the home. The thermostat 634 can directly measure energy consumption of the HVAC system associated with the thermostat, or can estimate energy consumption of the HVAC system associated with the thermostat 634, for example, based on detected usage of one or more components of the HVAC system associated with the thermostat 634. The thermostat 634 can communicate temperature and/or energy monitoring information to or from the control unit 610 and can control the environmental (e.g., temperature) settings based on commands received from the control unit 610.

In some implementations, the thermostat 634 is a dynamically programmable thermostat and can be integrated with the control unit 610. For example, the dynamically programmable thermostat 634 can include the control unit 610, e.g., as an internal component to the dynamically programmable thermostat 634. In addition, the control unit 610 can be a gateway device that communicates with the dynamically programmable thermostat 634. In some implementations, the thermostat 634 is controlled via one or more home automation controls 622.

A module 637 is connected to one or more components of an HVAC system associated with a home, and is configured to control operation of the one or more components of the HVAC system. In some implementations, the module 637 is also configured to monitor energy consumption of the HVAC system components, for example, by directly measuring the energy consumption of the HVAC system components or by estimating the energy usage of the one or more HVAC system components based on detecting usage of components of the HVAC system. The module 637 can communicate energy monitoring information and the state of the HVAC system components to the thermostat 634 and can control the one or more components of the HVAC system based on commands received from the thermostat 634.

In some examples, the system 600 further includes one or more robotic devices 690. The robotic devices 690 may be any type of robots that are capable of moving and taking actions that assist in home monitoring. For example, the robotic devices 690 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 690 may be devices that are intended for other purposes and merely associated with the system 600 for use in appropriate circumstances. For instance, a robotic vacuum cleaner device may be associated with the monitoring system 600 as one of the robotic devices 690 and may be controlled to take action responsive to monitoring system events.

In some examples, the robotic devices 690 automatically navigate within a home. In these examples, the robotic devices 690 include sensors and control processors that guide movement of the robotic devices 690 within the home. For instance, the robotic devices 690 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 690 may include control processors that process output from the various sensors and control the robotic devices 690 to move along a path that reaches the desired destination and avoids obstacles. In this regard, the control processors detect walls or other obstacles in the home and guide movement of the robotic devices 690 in a manner that avoids the walls and other obstacles.

In addition, the robotic devices 690 may store data that describes attributes of the home. For instance, the robotic devices 690 may store a floorplan and/or a three-dimensional model of the home that enables the robotic devices 690 to navigate the home. During initial configuration, the robotic devices 690 may receive the data describing attributes of the home, determine a frame of reference to the data (e.g., a home or reference location in the home), and navigate the home based on the frame of reference and the data describing attributes of the home. Further, initial configuration of the robotic devices 690 also may include learning of one or more navigation patterns in which a user provides input to control the robotic devices 690 to perform a specific navigation action (e.g., fly to an upstairs bedroom and spin around while capturing video and then return to a home charging base). In this regard, the robotic devices 690 may learn and store the navigation patterns such that the robotic devices 690 may automatically repeat the specific navigation actions upon a later request.

In some examples, the robotic devices 690 may include data capture and recording devices. In these examples, the robotic devices 690 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 690 to take and store a biometric sample that can be used to identify the person (e.g., a biometric sample with DNA that can be used for DNA testing).

In some implementations, the robotic devices 690 may include output devices. In these implementations, the robotic devices 690 may include one or more displays, one or more speakers, and/or any type of output devices that allow the robotic devices 690 to communicate information to a nearby user.

The robotic devices 690 also may include a communication module that enables the robotic devices 690 to communicate with the control unit 610, each other, and/or other devices. The communication module may be a wireless communication module that allows the robotic devices 690 to communicate wirelessly. For instance, the communication module may be a Wi-Fi module that enables the robotic devices 690 to communicate over a local wireless network at the home. The communication module further may be a 900 MHz wireless communication module that enables the robotic devices 690 to communicate directly with the control unit 610. Other types of short-range wireless communication protocols, such as Bluetooth, Bluetooth LE, Z-wave, Zigbee, etc., may be used to allow the robotic devices 690 to communicate with other devices in the home. In some implementations, the robotic devices 690 may communicate with each other or with other devices of the system 600 through the network 605.

The robotic devices 690 further may include processor and storage capabilities. The robotic devices 690 may include any suitable processing devices that enable the robotic devices 690 to operate applications and perform the actions described throughout this disclosure. In addition, the robotic devices 690 may include solid-state electronic storage that enables the robotic devices 690 to store applications, configuration data, collected sensor data, and/or any other type of information available to the robotic devices 690.

The robotic devices 690 are associated with one or more charging stations. The charging stations may be located at predefined home base or reference locations in the home. The robotic devices 690 may be configured to navigate to the charging stations after completion of tasks needed to be performed for the monitoring system 600. For instance, after completion of a monitoring operation or upon instruction by the control unit 610, the robotic devices 690 may be configured to automatically fly to and land on one of the charging stations. In this regard, the robotic devices 690 may automatically maintain a fully charged battery in a state in which the robotic devices 690 are ready for use by the monitoring system 600.

The charging stations may be contact based charging stations and/or wireless charging stations. For contact based charging stations, the robotic devices 690 may have readily accessible points of contact that the robotic devices 690 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 690 may charge through a wireless exchange of power. In these cases, the robotic devices 690 need only locate themselves closely enough to the wireless charging stations for the wireless exchange of power to occur. In this regard, the positioning needed to land at a predefined home base or reference location in the home may be less precise than with a contact based charging station. Based on the robotic devices 690 landing at a wireless charging station, the wireless charging station outputs a wireless signal that the robotic devices 690 receive and convert to a power signal that charges a battery maintained on the robotic devices 690.

In some implementations, each of the robotic devices 690 has a corresponding and assigned charging station such that the number of robotic devices 690 equals the number of charging stations. In these implementations, the robotic devices 690 always navigate to the specific charging station assigned to that robotic device. For instance, a first robotic device may always use a first charging station and a second robotic device may always use a second charging station.

In some examples, the robotic devices 690 may share charging stations. For instance, the robotic devices 690 may use one or more community charging stations that are capable of charging multiple robotic devices 690. The community charging station may be configured to charge multiple robotic devices 690 in parallel. The community charging station may be configured to charge multiple robotic devices 690 in serial such that the multiple robotic devices 690 take turns charging and, when fully charged, return to a predefined home base or reference location in the home that is not associated with a charger. The number of community charging stations may be less than the number of robotic devices 690.

In addition, the charging stations may not be assigned to specific robotic devices 690 and may be capable of charging any of the robotic devices 690. In this regard, the robotic devices 690 may use any suitable, unoccupied charging station when not in use. For instance, when one of the robotic devices 690 has completed an operation or is in need of battery charge, the control unit 610 references a stored table of the occupancy status of each charging station and instructs the robotic device to navigate to the nearest charging station that is unoccupied.

The system 600 further includes one or more integrated security devices 680. The one or more integrated security devices may include any type of device used to provide alerts based on received sensor data. For instance, the one or more control units 610 may provide one or more alerts to the one or more integrated security input/output devices 680. Additionally, the one or more control units 610 may receive one or more sensor data from the sensors 620 and determine whether to provide an alert to the one or more integrated security input/output devices 680.

The system 600 further includes one or more traffic monitoring devices 695 (e.g., monitoring devices 514*b*) in communication with the network 605 (e.g., network 502) through communication link 697. The one or more traffic monitoring devices 695 can include any type of device used to monitor traffic patterns along a particular roadway (e.g., an intersection, a stretch of highway, a traffic circle). For example, traffic monitoring devices 695 can be traffic cameras, Wi-Fi/Bluetooth receivers, pressure sensors, motion detectors, induction loops, etc. The one or more traffic monitoring devices 695 can collect data (e.g., imaging data) that can be used by system 600 to detect dangerous drivers.

In some implementations, a DDDR system (e.g., DDDR system 102) can be implemented on monitoring server application 660, as a part of the home monitoring system (e.g., home monitoring system 126). In some implementations, the DDDR system can be implemented on a separate server from the monitoring application server 660.

The sensors 620, the home automation controls 622, the camera 630, the thermostat 634, and the integrated security devices 680 may communicate with the controller 612 over communication links 624, 626, 628, 632, 638, and 684. The communication links 624, 626, 628, 632, 638, and 684 may be a wired or wireless data pathway configured to transmit signals from the sensors 620, the home automation controls 622, the camera 630, the thermostat 634, and the integrated security devices 680 to the controller 612. The sensors 620, the home automation controls 622, the camera 630, the thermostat 634, and the integrated security devices 680 may continuously transmit sensed values to the controller 612, periodically transmit sensed values to the controller 612, or transmit sensed values to the controller 612 in response to a change in a sensed value.

The communication links 624, 626, 628, 632, 638, and 684 may include a local network. The sensors 620, the home automation controls 622, the camera 630, the thermostat 634, and the integrated security devices 680, and the controller 612 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 660 is an electronic device configured to provide monitoring services by exchanging electronic communications with the control unit 610, the one or more user devices 640 and 650, and the central alarm station server 670 over the network 605. For example, the monitoring server 660 may be configured to monitor events (e.g., alarm events) generated by the control unit 610. In this example, the monitoring server 660 may exchange electronic communications with the network module 614 included in the control unit 610 to receive information regarding events (e.g., alerts) detected by the control unit 610. The monitoring server 660 also may receive information regarding events (e.g., alerts) from the one or more user devices 640 and 650.

In some examples, the monitoring server 660 may route alert data received from the network module 614 or the one or more user devices 640 and 650 to the central alarm station server 670. For example, the monitoring server 660 may transmit the alert data to the central alarm station server 670 over the network 605.

The monitoring server 660 may store sensor and image data received from the monitoring system and perform analysis of sensor and image data received from the monitoring system. Based on the analysis, the monitoring server 660 may communicate with and control aspects of the control unit 610 or the one or more user devices 640 and 650.

The monitoring server 660 may provide various monitoring services to the system 600. For example, the monitoring server 660 may analyze the sensor, image, and other data to determine an activity pattern of a resident of the home monitored by the system 600. In some implementations, the monitoring server 660 may analyze the data for alarm conditions or may determine and perform actions at the home by issuing commands to one or more of the automation controls 622, possibly through the control unit 610.

The monitoring server 660 can be configured to provide information (e.g., activity patterns) related to one or more residents of the home monitored by the system 600 (e.g., driver 104). For example, one or more of the sensors 620, the home automation controls 622, the camera 630, the thermostat 634, and the integrated security devices 680 can collect data related to a resident including location information (e.g., if the resident is home or is not home) and provide location information to the DDDR system for the resident.

The central alarm station server 670 is an electronic device configured to provide alarm monitoring service by exchanging communications with the control unit 610, the one or more mobile devices 640 and 650, and the monitoring server 660 over the network 605. For example, the central alarm station server 670 may be configured to monitor alerting events generated by the control unit 610. In this example, the central alarm station server 670 may exchange communications with the network module 614 included in the control unit 610 to receive information regarding alerting events detected by the control unit 610. The central alarm station server 670 also may receive information regarding alerting events from the one or more mobile devices 640 and 650 and/or the monitoring server 660.

The central alarm station server 670 is connected to multiple terminals 672 and 674. The terminals 672 and 674 may be used by operators to process alerting events. For example, the central alarm station server 670 may route alerting data to the terminals 672 and 674 to enable an operator to process the alerting data. The terminals 672 and 674 may include general-purpose computers (e.g., desktop personal computers, workstations, or laptop computers) that are configured to receive alerting data from a server in the central alarm station server 670 and render a display of information based on the alerting data. For instance, the controller 612 may control the network module 614 to transmit, to the central alarm station server 670, alerting data indicating that a sensor 620 detected motion from a motion sensor via the sensors 620. The central alarm station server 670 may receive the alerting data and route the alerting data to the terminal 672 for processing by an operator associated with the terminal 672. The terminal 672 may render a display to the operator that includes information associated with the alerting event (e.g., the lock sensor data, the motion sensor data, the contact sensor data, etc.) and the operator may handle the alerting event based on the displayed information.

In some implementations, the terminals 672 and 674 may be mobile devices or devices designed for a specific function. Although FIG. 6 illustrates two terminals for brevity, actual implementations may include more (and, perhaps, many more) terminals.

The one or more authorized user devices 640 and 650 are devices that host and display user interfaces. For instance, the user device 640 is a mobile device that hosts or runs one or more native applications (e.g., the home monitoring application 642). The mobile device 640 may be a cellular phone or a non-cellular locally networked device with a display. The mobile device 640 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 640 may perform functions unrelated to the monitoring system, such as placing personal telephone calls, playing music, playing video, displaying pictures, browsing the Internet, maintaining an electronic calendar, etc.

The mobile device 640 includes a home monitoring application 642. The home monitoring application 642 refers to a software/firmware program running on the corresponding mobile device that enables the user interface and features described throughout. The user device 640 may load or install the home monitoring application 642 based on data received over a network or data received from local media. The home monitoring application 642 runs on mobile devices platforms, such as iPhone, iPod touch, Blackberry, Google Android, Windows Mobile, etc. The home monitoring application 642 enables the user device 640 to receive and process image and sensor data from the monitoring system.

The user device 650 may be a general-purpose computer (e.g., a desktop personal computer, a workstation, or a laptop computer) that is configured to communicate with the monitoring server 660 and/or the control unit 610 over the network 605. The user device 650 may be configured to display a smart home user interface 652 that is generated by the user device 650 or generated by the monitoring server 660. For example, the user device 650 may be configured to display a user interface (e.g., a web page) provided by the monitoring server 660 that enables a user to perceive images captured by the camera 630 and/or reports related to the monitoring system. Although FIG. 6 illustrates two user devices for brevity, actual implementations may include more (and, perhaps, many more) or fewer user devices.

In some implementations, the one or more user devices 640 and 650 communicate with and receive monitoring system data from the control unit 610 using the communication link 638. For instance, the one or more user devices 640 and 650 may communicate with the control unit 610 using various local wireless protocols such as Wi-Fi, Bluetooth, Z-wave, Zigbee, HomePlug (ethernet over power line), or wired protocols such as Ethernet and USB, to connect the one or more user devices 640 and 650 to local security and automation equipment. The one or more user devices 640 and 650 may connect locally to the monitoring system and its sensors and other devices. The local connection may improve the speed of status and control communications because communicating through the network 605 with a remote server (e.g., the monitoring server 660) may be significantly slower.

Although the one or more user devices 640 and 650 are shown as communicating with the control unit 610, the one or more user devices 640 and 650 may communicate directly with the sensors and other devices controlled by the control unit 610. In some implementations, the one or more user devices 640 and 650 replace the control unit 610 and perform the functions of the control unit 610 for local monitoring and long range/offsite communication.

In other implementations, the one or more user devices 640 and 650 receive monitoring system data captured by the control unit 610 through the network 605. The one or more user devices 640, 650 may receive the data from the control unit 610 through the network 605 or the monitoring server 660 may relay data received from the control unit 610 to the one or more user devices 640 and 650 through the network 605. In this regard, the monitoring server 660 may facilitate communication between the one or more user devices 640 and 650 and the monitoring system.

In some implementations, the one or more user devices 640 and 650 may be configured to switch whether the one or more user devices 640 and 650 communicate with the control unit 610 directly (e.g., through link 638) or through the monitoring server 660 (e.g., through network 605) based on a location of the one or more user devices 640 and 650. For instance, when the one or more user devices 640 and 650 are located close to the control unit 610 and in range to communicate directly with the control unit 610, the one or more user devices 640 and 650 use direct communication. When the one or more user devices 640 and 650 are located far from the control unit 610 and not in range to communicate directly with the control unit 610, the one or more user devices 640 and 650 use communication through the monitoring server 660.

Although the one or more user devices 640 and 650 are shown as being connected to the network 605, in some implementations, the one or more user devices 640 and 650 are not connected to the network 605. In these implementations, the one or more user devices 640 and 650 communicate directly with one or more of the monitoring system components and no network (e.g., Internet) connection or reliance on remote servers is needed.

In some implementations, the one or more user devices 640 and 650 are used in conjunction with only local sensors and/or local devices in a house. In these implementations, the system 600 includes the one or more user devices 640 and 650, the sensors 620, the home automation controls 622, the camera 630, and the robotic devices 690. The one or more user devices 640 and 650 receive data directly from the sensors 620, the home automation controls 622, the camera 630, and the robotic devices 690, and sends data directly to the sensors 620, the home automation controls 622, the camera 630, and the robotic devices 690. The one or more user devices 640, 650 provide the appropriate interfaces/processing to provide visual surveillance and reporting.

In other implementations, the system 600 further includes network 605 and the sensors 620, the home automation controls 622, the camera 630, the thermostat 634, and the robotic devices 690, and are configured to communicate sensor and image data to the one or more user devices 640 and 650 over network 605 (e.g., the Internet, cellular network, etc.). In yet another implementation, the sensors 620, the home automation controls 622, the camera 630, the thermostat 634, and the robotic devices 690 (or a component, such as a bridge/router) are intelligent enough to change the communication pathway from a direct local pathway when the one or more user devices 640 and 650 are in close physical proximity to the sensors 620, the home automation controls 622, the camera 630, the thermostat 634, and the robotic devices 690 to a pathway over network 605 when the one or more user devices 640 and 650 are farther from the sensors 620, the home automation controls 622, the camera 630, the thermostat 634, and the robotic devices 490.

In some examples, the system leverages GPS information from the one or more user devices 640 and 650 to determine whether the one or more user devices 640 and 650 are close enough to the sensors 620, the home automation controls 622, the camera 630, the thermostat 634, and the robotic devices 690 to use the direct local pathway or whether the one or more user devices 640 and 650 are far enough from the sensors 620, the home automation controls 622, the camera 630, the thermostat 634, and the robotic devices 690 that the pathway over network 605 is required.

In other examples, the system leverages status communications (e.g., pinging) between the one or more user devices 640 and 650 and the sensors 620, the home automation controls 622, the camera 630, the thermostat 634, and the robotic devices 690 to determine whether communication using the direct local pathway is possible. If communication using the direct local pathway is possible, the one or more user devices 640 and 650 communicate with the sensors 620, the home automation controls 622, the camera 630, the thermostat 634, and the robotic devices 690 using the direct local pathway. If communication using the direct local pathway is not possible, the one or more user devices 640 and 650 communicate with the sensors 620, the home automation controls 622, the camera 630, the thermostat 634, and the robotic devices 690 using the pathway over network 605.

In some implementations, the system 600 provides end users with access to images captured by the camera 630 to aid in decision making. The system 600 may transmit the images captured by the camera 630 over a wireless WAN network to the user devices 640 and 650. Because transmission over a wireless WAN network may be relatively expensive, the system 600 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 630). In these implementations, the camera 630 may be set to capture images on a periodic basis when the alarm system is armed in an "away" state, but set not to capture images when the alarm system is armed in a "home" state or disarmed. In addition, the camera 630 may be triggered to begin capturing images when the alarm system detects an event, such as an alarm event, a door-opening event for a door that leads to an area within a field of view of the camera 630, or motion in the area within the field of view of the camera 630. In other implementations, the camera 630 may capture images continuously, but the captured images may be stored or transmitted over a network when needed.

Figure 7:
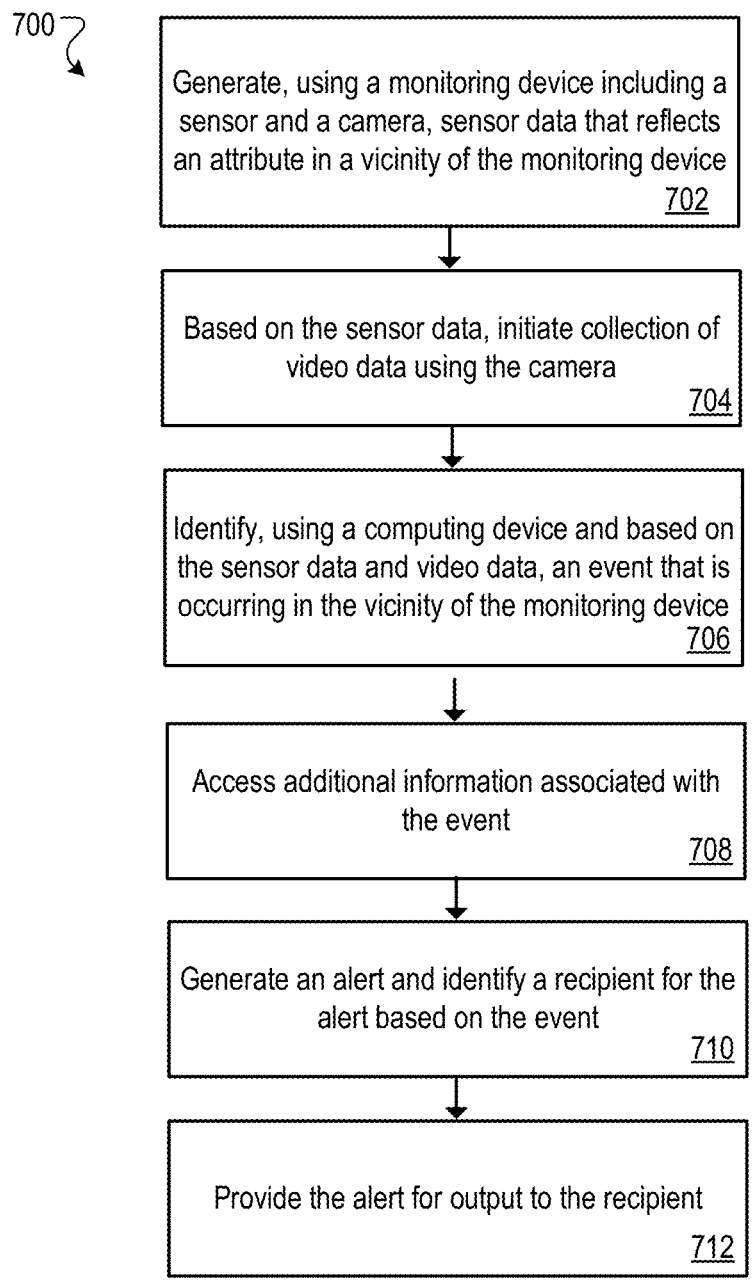
FIG. 7 is a process flow diagram of another example process of a dangerous driver detection and response system.

FIG. 7 is a process flow diagram of another example process 700 of a dangerous driver detection and response system. Sensor data is generated that reflects an attribute in a vicinity of a monitoring device, where the monitoring device includes a sensor and a camera (702). Sensor data, e.g., audio data, can be a verbal command 116 from a driver of vehicle 110 using a monitoring device 114, e.g., a smart speaker, mobile phone, or the like. The attribute in the vicinity of the monitoring device 114 can include one or more descriptive terms about a dangerous driver 104 or another road hazard, e.g., an object in the roadway. For example, the attribute can include a color, make, and/or model of the vehicle 106, a location of the dangerous driver 104 relative to the reporting driver 108, or the like.

Collection of video data using the camera is initiated based on the sensor data (704). The onboard event recorder 112 can receive the sensor data, e.g., the verbal command 116 from the driver 108 and initiate collecting video data using a camera that is one of the monitoring devices 114 of the vehicle 110. Video data can be collected, for example, for a particular angular range surrounding the vehicle 110, where a particular field of view can be captured that is responsive to one or more attributes reflected by the sensor data. For example, the sensor data can include a particular orientation of the dangerous driver 104 relative to the driver 108, e.g., "the red car on the right is driving dangerously," where the camera may be oriented with its field of view facing to the right of the vehicle 110 in response.

An event that is occurring in the vicinity of the monitoring device is identified using a computing device and based on the sensor data and video data (706). The computer device, e.g., the onboard event recorder 112, can be an onboard computer for vehicle 110, a mobile device for the driver 108, or the like. In some implementations, some or all of the processing of event data, e.g., event data 113, can be performed on a cloud-based server. For example, the computer device can be a cloud-based server, e.g., DDDR System 102, where the sensor data and video data are provided to the DDDR System 102 by the onboard event recorder 112.

Additional information associated with the event is accessed (708). Additional information can assist in identifying the vehicle of the dangerous driver, the dangerous driver, and/or other relevant details for the dangerous driver event. Vehicle registration data 124 and emergency service provider data 130 can be accessed, e.g., in public or governmental databases, to assist in identifying an owner of the vehicle 106 of the dangerous driver and identify a local authority to contact in response to identifying the dangerous driver event.

Driver location data 128 can be accessed for a home monitoring system 126 associated with the vehicle 106 of the dangerous driver to assist in determining a likely identity of the dangerous driver 104. Driver location data 128 can include information tracking users associated with a home monitoring system 126, e.g., residents of a home, where the tracking information can indicate which users left the home in particular vehicles. Driver location data 128 can identify a particular user that was recorded leaving in the vehicle 106 by the home monitoring system 126, and can be used to determine the likely identify of the dangerous driver 104.

An alert is generated and a recipient is identified for the alert based on the event (710). As described with reference to FIG. 1, an alert is generated and can include information related to the dangerous driver event, e.g., vehicle information, location information, video data, and the like. A recipient for the alert can be identified based on a type of event, e.g., a reckless driver, roadside hazard, inexperienced driver, commercial vehicle involved, etc. Recipients can be emergency services, e.g., police, ambulance, utilities services, first responders, etc., an owner of the vehicle 106, e.g., commercial business owner, a parent of the driver, etc., and/or other users that are determined to be located in a same vicinity or along a travel path of the dangerous driver. For example, an alert 138 can be provided to a police officer 140 in the jurisdiction of the dangerous driver 104. In another example, as depicted in FIG. 5, a pedestrian on a mobile device 514c can be selected as a recipient of the alert 538 based on the location of the pedestrian relative to the vehicle 506 of the dangerous driver 504.

The alert is provided for output to the recipient (712). The alert is provided to one or more receiving devices for the identified recipient. The alert can be provided, for example, to a mobile device via text/SMS, through an application environment, automated phone call, or the like. The alert can be provided to a computing device, e.g., a tablet or computer, for a recipient, e.g., through an application environment, email, or the like. For example, the alert can be provided to a business owner via email. In another example, the alert can be provided to a dispatch service for an emergency service provider. In some implementations, the alert can be provided to an onboard event recorder 512 of the recipient, e.g., a different driver on the road 514d, as a verbal or non-verbal notification. In one example, an onboard event recorder of the recipient can provide an audio alert for the driver of the vehicle about the dangerous driver event.

In some implementations, the alert can include instructions to provide additional information about the dangerous driver event. As depicted in FIG. 5, the receiving vehicle 515 includes a monitoring device 514d configured to provide additional video data about the dangerous driver responsive to the alert 538. In another example, the alert is provided to a mobile device of a pedestrian in the vicinity of the dangerous driver event, where the alert can include instructions to provide additional data, e.g., location data, video data, or the like, of the dangerous driver event.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A system comprising:
 a monitoring device that includes a sensor and a camera and that is configured to:
  generate, using the sensor, sensor data that reflects an attribute in a vicinity of the monitoring device; and
  based on the sensor data, initiate collection of video data using the camera; and
 a computing device that is configured to:
  based on the sensor data and the video data, identify an event that is occurring in the vicinity of the monitoring device;
  based on the event that is occurring in the vicinity of the monitoring device, access additional information associated with the event;
  based on the event, generate an alert and identify a recipient for the alert; and
  provide, for output to the recipient, the alert.

2. The system of claim 1, wherein the computing device is configured to:
 identify a different monitoring device that is geographically proximate to a location of the event and that includes a camera;

provide instructions to the different monitoring device to initiate collection of video data using the camera; and receive, from the different monitoring device, the collected video data.

3. The system of claim 1, wherein the computing device is configured to:

identify an event that is occurring in the vicinity of the monitoring device by determining that a dangerous driver event is occurring in the vicinity of the monitoring device.

4. The system of claim 1, wherein the computing device is configured to:

determine a verbal or non-verbal command from a user based on the sensor data.

5. The system of claim 4, wherein the computing device is configured to:

determine a likely intent of the user based on the verbal or non-verbal command; and identify the event that is occurring in the vicinity of the monitoring system based on the verbal or non-verbal command and the likely intent of the user.

6. The system of claim 1, wherein the monitoring device is configured to:

generate additional sensor data that reflects an additional attribute in the vicinity of the monitoring device;

determine that the additional sensor data comprises a verbal or non-verbal command indicating an end of the event; and in response to determining that the additional sensor data comprises a verbal or non-verbal command indicating the end of the event, stop collection of the video data.

7. The system of claim 1, wherein:

the monitoring device is included in a vehicle driven by a user, and the computing device is configured to:

identify the recipient for the alert by identifying an additional, different user; and provide, for output, the alert by providing, for output to the additional, different user, the alert.

8. The system of claim 7, wherein the computing device is configured to:

identify the additional, different user by:

determining a current location of the event; and determining that a mobile device of an additional, different user is geographically proximate to the current location of the event; and provide, based on determining that the mobile device of the additional, different user is geographically proximate to the current location of the event, for output to the mobile device of the additional, different user, the alert.

9. The system of claim 1, wherein the computing device is configured to:

generate metadata that describes the event; and provide, for output, the alert by providing the video data and the metadata.

10. The system of claim 1, wherein the computing device is configured to:

determine a type of response for the event;

access, from among multiple rules for different responses, a rule for the type of response for the event; and based on the rule for the type of response, determine an event response for the event.

11. The system of claim 1, wherein the computing device is configured to:

identify a recipient for the alert by identifying a local authority as the recipient of the alert.

12. The system of claim 11, wherein identifying a local authority as the recipient of the alert comprises:

determining a current location of the event; and determining, based on the current location of the event, a local authority.

13. The system of claim 12, wherein:

identifying the local authority as the recipient of the alert comprises:

determining a direction of movement of the event; and determining, based on the direction of movement of the event, a second local authority, and the computing device is configured to:

provide, for output to the second local authority, the alert.

14. The system of claim 1, wherein providing the alert comprises providing, to the identified recipient, real-time event data for the event while the event is in process including one or more of additional video data and additional location information.

15. The system of claim 1, wherein the computing device is configured to:

identify an event that is occurring in the vicinity of the monitoring device by determining that a vehicle with a dangerous driver is in the vicinity of the monitoring system;

access additional information associated with the event by accessing additional information associated with an identify of the dangerous driver;

based on the additional information associated with the identity of the dangerous driver, determine the identity of the dangerous driver; and generate the alert and identify the recipient for the alert based on the identity of the dangerous driver.

16. The system of claim 15, wherein the computing device is configured to:

access the additional information associated with the identity of the dangerous driver by identifying vehicle information data for the vehicle;

based on the vehicle information data for the vehicle, determine a property and a home monitoring system associated with the vehicle;

access home monitoring system data for the home monitoring system; and determine the identity of the dangerous driver based on the vehicle information data for the vehicle and the home monitoring system data.

17. The system of claim 16, wherein the computing device is configured to:

determine locations of residents of the property associated with the vehicle based on the home monitoring system data; and determine the identity of the dangerous driver based on the locations of the residents of the property associated with the vehicle.

18. The system of claim 17, wherein the computing device is configured to:

based on the vehicle information data for the vehicle, determine an owner of the vehicle; and determine the identity of the dangerous driver based on the owner of the vehicle and the locations of the residents of the property associated with the vehicle.

19. The system of claim 18, wherein the computing device is configured to:

identify the recipient for the alert by identifying the owner of the vehicle as the recipient for the alert; and provide, for output, the alert by providing, for output to the owner of the vehicle, the alert.

20. A computer-implemented method comprising:
generating, by a monitoring device including a sensor and a camera, sensor data that reflects an attribute in a vicinity of the monitoring device;
based on the sensor data, initiating, by the monitoring device, collection of video data using the camera;
based on the sensor data and video data, identifying, by a computing device, an event that is occurring in the vicinity of the monitoring device;
based on the event that is occurring in the vicinity of the monitoring device, accessing, by the computing device, additional information associated with the event;
based on the event, generating, by the computing device, an alert;
based on the event, identifying, by the computing device, a recipient for the alert; and
providing, by the computing device and for output to the recipient, the alert.

\* \* \* \* \*

UNITED STATES PATENT AND TRADEMARK OFFICE
CERTIFICATE OF CORRECTION

| | |
|---|---|
| PATENT NO. | : 10,997,430 B1 |
| APPLICATION NO. | : 16/533935 |
| DATED | : May 4, 2021 |
| INVENTOR(S) | : Alison Jane Slavin |

It is certified that error appears in the above-identified patent and that said Letters Patent is hereby corrected as shown below:

In the Claims

In Claim 15, Column 34, Line 28, delete "identify" and insert -- identity --, therefor.

Signed and Sealed this
Sixth Day of July, 2021

Drew Hirshfeld
*Performing the Functions and Duties of the
Under Secretary of Commerce for Intellectual Property and
Director of the United States Patent and Trademark Office*